US012196607B2

(12) United States Patent
 Fan

(10) Patent No.: US 12,196,607 B2
(45) Date of Patent: Jan. 14, 2025

(54) OPTICAL SYSTEM, OPTICAL SENSING UNIT AND OPTICAL SENSING MODULE

(71) Applicant: Egis Technology Inc., Hsinchu (TW)

(72) Inventor: Chen-Wei Fan, Taiwan (CN)

(73) Assignee: Egis Technology Inc., Hsinchu (TW)

( * ) Notice: Subject to any disclaimer, the term of this patent is extended or adjusted under 35 U.S.C. 154(b) by 291 days.

(21) Appl. No.: 17/823,648

(22) Filed: Aug. 31, 2022

(65) Prior Publication Data

US 2023/0065865 A1    Mar. 2, 2023

Related U.S. Application Data

(60) Provisional application No. 63/239,954, filed on Sep. 2, 2021, provisional application No. 63/291,952, filed on Dec. 21, 2021.

(30) Foreign Application Priority Data

Aug. 15, 2022    (CN) .......................... 202210975368.4

(51) Int. Cl.
 *G01J 1/04* (2006.01)
 *G02B 5/04* (2006.01)
(52) U.S. Cl.
 CPC ........... *G01J 1/0411* (2013.01); *G01J 1/0477* (2013.01); *G02B 5/045* (2013.01)
(58) Field of Classification Search
 CPC .......... G01J 1/04; G01J 1/0407; G01J 1/0411; G01J 1/0414; G01J 1/0422; G01J 1/0477; G02B 27/106; G02B 5/04; G02B 5/045
 See application file for complete search history.

(56) References Cited

U.S. PATENT DOCUMENTS 11,386,691 B2 *    7/2022  Gao ..................... G02B 3/0062
2019/0049631 A1 *  2/2019  Lin ........................ G02B 5/005
(Continued)

FOREIGN PATENT DOCUMENTS

| CN | 111837131 A | 10/2020 |
| CN | 109196525 B | 12/2020 |
| TW | 201830079   | 8/2018  |

OTHER PUBLICATIONS

1 "Office Action of Taiwan Counterpart Application", issued on Nov. 7, 2023, pp. 1-4.

*Primary Examiner* — John R Lee
(74) *Attorney, Agent, or Firm* — JCIPRNET

(57) ABSTRACT

The disclosure provides an optical system, an optical sensing unit and an optical sensing module. The optical system is used for forming a plurality of light spots on a plurality of photosensitive regions separated from each other. The optical system includes: a lens for receiving a first light beam and converging the first light beam; a first light-transmitting layer located under the lens, for refracting the converged first light beam into a plurality of second light beams, the plurality of second light beams being used for forming the plurality of light spots on the photosensitive regions, wherein each light spot in the plurality of light spots covers a part of the plurality of photosensitive regions; and a second light-transmitting layer located under the first light-transmitting layer, wherein the plurality of second light beams are respectively incident on the plurality of photosensitive regions through the second light-transmitting layer.

21 Claims, 18 Drawing Sheets

(56) References Cited

U.S. PATENT DOCUMENTS

| | | | |
|---|---|---|---|
| 2019/0344516 A1* | 11/2019 | Maruyama | G02B 3/0068 |
| 2020/0341386 A1 | 10/2020 | Van Greevenbroek | |
| 2021/0286963 A1* | 9/2021 | Gao | G06V 40/1318 |
| 2023/0065865 A1* | 3/2023 | Fan | G02B 27/0905 |

\* cited by examiner

OPTICAL SYSTEM, OPTICAL SENSING UNIT AND OPTICAL SENSING MODULE

CROSS-REFERENCE TO RELATED APPLICATIONS

The present application claims priority to Chinese Application No. 202210975368.4, filed Aug. 15, 2022, and to U.S. Provisional Application No. 63/239,954, filed on Sep. 2, 2021, and to U.S. Provisional Application No. 63/291,952, filed on Dec. 21, 2021. All of the aforementioned applications are incorporated herein by reference in their entireties.

TECHNICAL FIELD

The present disclosure relates to the field of optical sensing, and in particular, relates to an optical system, an optical sensing unit and an optical sensing module.

BACKGROUND

FIG. 1A shows a schematic diagram of an optical sensing array in prior art. As shown in FIG. 1A, the optical sensing array 1000 includes a plurality of optical sensing units 1100, each of which may be a macro-pixel.

FIGS. 1B and 1C show a schematic top view and a schematic cross-sectional side view of the optical sensing unit 1100 in FIG. 1A, respectively. In FIG. 1B, the optical sensing unit 1100 includes a plurality of photosensitive regions 1101 and a non-photosensitive region 1102 surrounding the photosensitive regions 1101. The photosensitive regions 1101 can be used for sensing incident light, and the non-photosensitive region 1102 can be used for arranging circuits and/or reserved as clearance region. As can be seen from FIG. 1B, the photosensitive regions 1101 in one optical sensing unit 1100 accounts for a low proportion of the area of the optical sensing unit 1100. As shown in FIG. 1C, the optical sensing unit 1100 further includes an oxide layer 1103, which covers the photosensitive regions 1101 and the non-photosensitive region 1102 and can transmit light. Taking the case where light is vertically incident on the optical sensing unit 1100 as an example, most of the incident light falls outside the photosensitive regions 1101, so the efficiency of light sensing by the optical sensing unit 1100 is very low.

SUMMARY

According to aspects of present disclosure, an optical system, an optical sensing unit and an optical sensing module are provided. The optical system can correspondingly form a plurality of light spots on a plurality of photosensitive regions separated from each other, so as to improve the intensity of light incident on the photosensitive regions and improve the efficiency of light sensing.

According to an aspect of present disclosure, there is provided an optical system, for forming a plurality of light spots on a plurality of photosensitive regions separated from each other, comprising: a lens for receiving a first light beam and converging the first light beam; a first light-transmitting layer, located under the lens and used for refracting the converged first light beam into a plurality of second light beams, wherein the plurality of second light beams are used for forming the plurality of light spots on the plurality of photosensitive regions, wherein each light spot of the plurality of light spots covers a part of the plurality of photosensitive regions; and a second light-transmitting layer, located under the first light-transmitting layer, wherein the plurality of second light beams are respectively incident on the plurality of photosensitive regions through the second light-transmitting layer.

According to an aspect of present disclosure, the first light-transmitting layer comprises a first dielectric layer and a second dielectric layer; wherein, the upper surface of the second dielectric layer is provided with at least one convex structure or at least one concave structure, and each structure of the at least one convex structure or the at least one concave structure refracts light incident on its light-incident surface, so that the converged first light beam is refracted into the plurality of second light beams; or the lower surface of the second dielectric layer is provided with at least one convex structure or at least one concave structure, and each structure of the at least one convex structure or the at least one concave structure refracts light to be emitted from its light-emitting surface, so that the converged first light beam is refracted into the plurality of second light beams.

According to an aspect of present disclosure, each structure of the at least one convex structure or the at least one concave structure is a polygonal pyramid, and a number of lateral faces of each polygonal pyramid is equal to a number of the plurality of photosensitive regions.

According to an aspect of present disclosure, each structure of the at least one convex structure or the at least one concave structure is a polygonal prism, and a number of lateral faces of each polygonal prism is related to a number of the plurality of photosensitive regions.

According to an aspect of present disclosure, the second dielectric layer is provided with a plurality of convex structures or a plurality of concave structures, wherein the plurality of convex structures or the plurality of concave structures are arranged in an array of N*M, N and M are integers greater than or equal to 2, and N is equal to or not equal to M.

According to an aspect of present disclosure, the second dielectric layer is provided with a plurality of convex structures or a plurality of concave structures, wherein each structure of the plurality of convex structures or the plurality of concave structures is an axisymmetric polygonal prism, and the plurality of convex structures or the plurality of concave structures are arranged in parallel to form a linear array; and a number of lateral faces for light refraction of each polygonal prism is related to a number of the plurality of photosensitive regions.

According to an aspect of present disclosure, each polygonal prism is a triangular prism, at least two triangular prisms form a triangular prism group, and each triangular prism group is used for forming two stripe-shaped light spots.

According to an aspect of present disclosure, the plurality of convex structures or the plurality of concave structures comprise polygonal prisms of at least two sizes, and angles of lateral faces for light refraction of polygonal prisms of different sizes are different.

According to an aspect of present disclosure, the plurality of concave structures comprise triangular prisms of two sizes, and triangular prisms of a first size and triangular prisms of a second size are alternately arranged, wherein the triangular prisms of the first size form a first triangular prism group, and the triangular prisms of the second size form a second triangular prism group, and each triangular prism group is used for forming two striped-shaped light spots.

According to an aspect of present disclosure, the plurality of convex structures or the plurality of concave structures comprise triangular prisms of two sizes, and triangular prisms of a first size and triangular prisms of a second size are arranged in different regions, wherein the triangular prisms of the first size form a first triangular prism group, and the triangular prisms of the second size form a second triangular prism group, and each triangular prism group is used for forming two striped-shaped light spots.

According to an aspect of present disclosure, in case that the second dielectric layer includes at least one convex structure, a refractive index of the second dielectric layer is smaller than the refractive index of the first dielectric layer and is smaller than the refractive index of the second light-transmitting layer; or the refractive index of the second dielectric layer is greater than the refractive index of the first dielectric layer and is smaller than the refractive index of the second light-transmitting layer.

According to an aspect of present disclosure, the refractive index of the first dielectric layer is less than or equal to the refractive index of the lens.

According to an aspect of present disclosure, in case that the second dielectric layer includes at least one concave structure, a refractive index of the second dielectric layer is greater than the refractive index of the first dielectric layer and is greater than the refractive index of the second light-transmitting layer.

According to an aspect of present disclosure, the refractive index of the first dielectric layer is greater than or equal to the refractive index of the lens.

According to an aspect of present disclosure, the greater a difference between the refractive index of the second dielectric layer and the refractive index of the first dielectric layer is, the farther the light spots formed through the plurality of second light beams are from each other; and/or the greater the difference between the refractive index of the second dielectric layer and the refractive index of the second light-transmitting layer is, the farther the light spots formed through the plurality of second light beams are from each other.

According to an aspect of present disclosure, the first dielectric layer is interposed between the lens and the second dielectric layer, or the second dielectric layer is interposed in the first dielectric layer.

According to an aspect of present disclosure, a lateral face of each of the at least one convex structure or the at least one concave structure comprises a stepped multi-stage phase structure.

According to an aspect of present disclosure, in case that the second dielectric layer includes one or more convex structures, the second dielectric layer includes a substrate layer and one or more convex structures formed on the substrate layer; in case that the second dielectric layer includes one or more concave structures, the second dielectric layer includes a substrate layer and one or more concave structures formed in the substrate layer.

According to an aspect of present disclosure, there is provided an optical sensing unit, comprising: a lens for receiving a first light beam and converging the first light beam; a first light-transmitting layer, located under the lens and used for refracting the converged first light beam into a plurality of second light beams; a second light-transmitting layer, located under the first light-transmitting layer and used for refracting the plurality of second light beams; and a plurality of photosensitive regions separated from each other, located under the second light-transmitting layer and used for sensing an intensity of the plurality of second light beams after being refracted by the second light-transmitting layer; wherein the plurality of second light beams are used for forming a plurality of light spots, and each light spot in the plurality of light spots covers a part of the plurality of photosensitive regions.

According to an aspect of present disclosure, there is provided an optical sensing module comprising a plurality of optical sensing units arranged in an array.

According to an aspect of present disclosure, each optical sensing unit is independent of each other, and the plurality of optical sensing units include lenses independent of each other.

According to the optical system, the optical sensing unit and the optical sensing module of the aspects of the present disclosure, by changing, by using a second dielectric layer, the propagation direction of a first light beam converged through the lens, the first light beam can be separated into a plurality of second light beams, so as to form a plurality of light spots on a plurality of photosensitive regions which are separated, thereby improving the efficiency of light sensing. In addition, by changing the refractive index of the second dielectric layer, the position of the second dielectric layer can be flexibly arranged, and the structures of the optical system and the optical sensing module can be more easily adapted to product requirements.

BRIEF DESCRIPTION OF THE DRAWINGS

In order to more clearly explain the technical solution of the aspects of the present disclosure, the following will briefly introduce the drawings of the aspects. Obviously, the drawings described below only relate to some aspects of the present disclosure, but are not limitations for the present disclosure.

DETAILED DESCRIPTION

To make the purpose, technical solution and advantages of the aspects of the present disclosure clearer, the technical solution of the aspects of the present disclosure will be clearly and completely described below with reference to the drawings. Obviously, the described aspects are part of the aspects of the present disclosure, but not all of them. Based on the described aspects of the present disclosure, all other aspects obtained by those skilled in the art without inventive labor are within the protection scope of the present disclosure.

Unless otherwise defined, the technical terms or scientific terms used in the present disclosure shall have their ordinary meanings as understood by those with ordinary skills in the field to which the present disclosure pertains. The words "first", "second" and the like used in the present disclosure do not indicate any order, quantity or importance, but are only used to distinguish different components. Similarly, similar words such as "one", "a" or "the" do not mean the quantity limit, but the existence of at least one. Similar words such as "include" or "comprise" mean that the components or objects appearing before the words cover the components or objects listed after the words and their equivalents, without excluding other components or objects. Words such as "connected to" or "connected with" are not limited to physical or mechanical connections, but can include direct or indirect electrical connections. Words such as "up", "down", "left" and "right" are only used to indicate the relative position relationship. When the absolute position of the described object changes, the relative position relationship may also change accordingly.

According to aspects of present disclosure, an optical system, an optical sensing unit and an optical sensing module are provided. The optical system can correspondingly form a plurality of light spots on a plurality of photosensitive regions separated from each other, so as to improve the intensity of light incident on the photosensitive regions and improve the efficiency of light sensing.

Figure 2A:
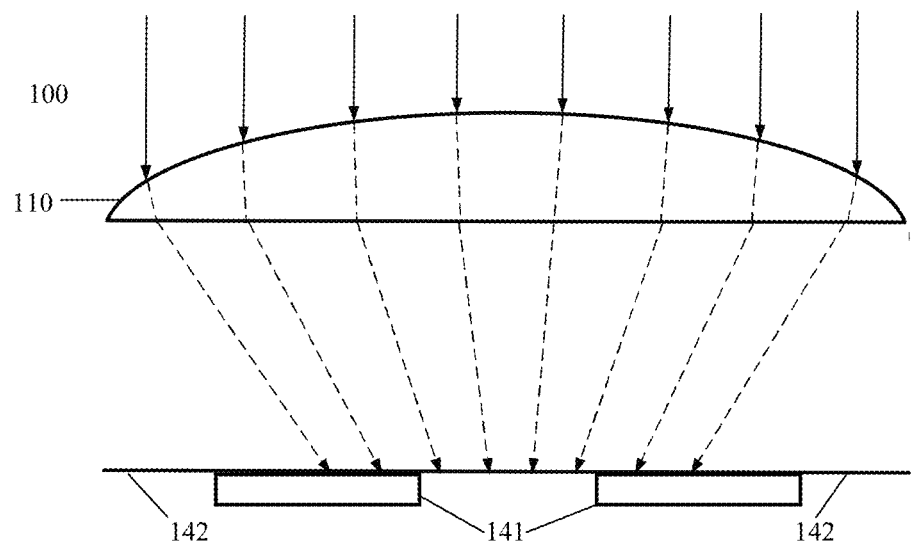
FIG. 2A shows a schematic cross-sectional side view of an optical system according to an aspect of the present disclosure.
Figure 2B:
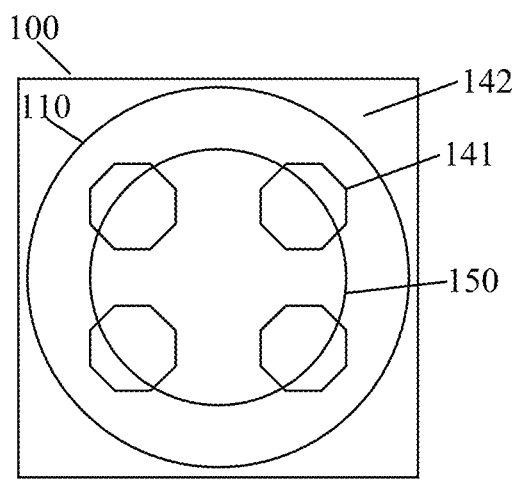
FIG. 2B shows a schematic top view of an optical system according to an aspect of the present disclosure.

FIG. 2A shows a schematic cross-sectional side view of an optical system 100 according to an aspect of the present disclosure, and FIG. 2B shows a schematic top view of the optical system 100 according to an aspect of the present disclosure. The optical system 100 may be an optical system for a single optical sensing unit in an optical sensing array.

As shown in FIG. 2A, the optical system 100 includes a lens 110. A plurality of photosensitive regions 141 are arranged on the photosensitive surface under the optical system 100, and the photosensitive regions 141 are surrounded by a non-photosensitive region 142. The lens 110 receives an incident first light beam and converges the incident first light beam. In all the drawings of the present disclosure, for the convenience of understanding, the incident first light beam is shown as being perpendicular to the photosensitive regions or being vertical forward light, but it should be understood that the incident first light beam in practical application can be an incident light beam from any direction.

As shown in FIG. 2A, if there is a transparent medium (such as an oxide layer) between the lens 110 and the photosensitive regions 141, the first light beam is refracted at the light-incident surface of the lens 110 for the first time and refracted at the light-emitting surface of the lens 110 for the second time, so that the first light beam is converged, as shown by the dotted lines in FIG. 2A. Finally, a light spot (as shown by the light spot 150 in FIG. 2B) is formed in the central region of the photosensitive surface opposite to the central region of the lens 110. For example, the lens 110 may be a Giant Micro Lens (GML). The size of the light spot 150 is much smaller than the size of whole region that can be irradiated by the vertically incident light. Therefore, the lens 110 can effectively reduce the area of the light spot on the photosensitive surface.

As shown in the top view of FIG. 2B, the area of the lens 110 is basically the same as that of the optical system 100, and the light spot 150 formed after the first light beam is converged overlaps with the central region of the optical system 100. In addition, as shown in FIG. 2B, the light spot 150 can only cover a part of four photosensitive regions 141, and the other part of each photosensitive region 141 is not covered by the light spot 150, that is, the incident light cannot reach the other part of each photosensitive region 141. Furthermore, as shown in FIG. 2B, a large part of the central region of the light spot 150 does not fall within any of the photosensitive regions 141.

In order to further improve the correspondence between a plurality of light spots and a plurality of photosensitive regions, and further improve the efficiency of light sensing, the aspects of the present disclosure also provide a further improved optical system.

Figure 3A:
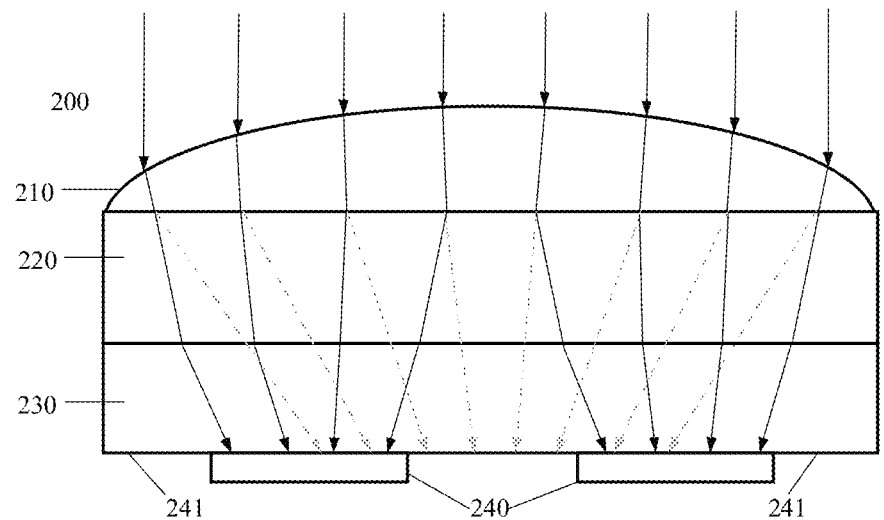
FIG. 3A shows a schematic cross-sectional side view of another optical system according to an aspect of the present disclosure.
Figure 3B:
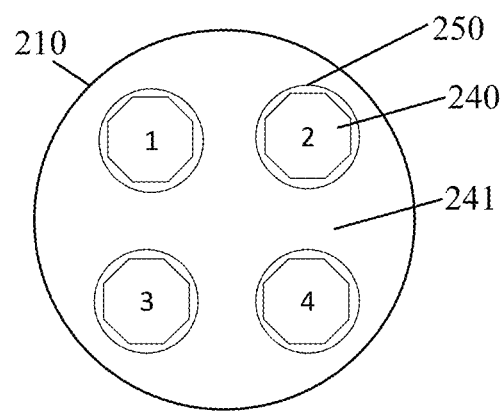
FIG. 3B shows a schematic top view of light spot positions of the optical system shown in FIG. 3A according to an aspect of the present disclosure.

FIG. 3A shows a schematic cross-sectional side view of another optical system according to an aspect of the present disclosure; FIG. 3B shows a schematic top view of positions of light spots formed by the optical system shown in FIG. 3A according to an aspect of the present disclosure.

According to the aspects of the present disclosure, as shown in FIG. 3A, the optical system 200 includes a lens 210, a first light-transmitting layer 220, and a second light-transmitting layer 230. The first light-transmitting layer 220 is provided between the lens 210 and the second light-transmitting layer 230. As shown in FIG. 3A, the first light-transmitting layer 220 is provided on and attached to the second light-transmitting layer 230, and the lens 210 is provided on and attached to the first light-transmitting layer 220. One side face of the lens 210 is a planar surface, and the other side face is a convex curved surface (i.e. a convex surface).

It should be understood that only the first light-transmitting layer 220 and the second light-transmitting layer 230 are schematically shown in FIG. 3A. According to the aspects of the present disclosure, the first light-transmitting layer 220 may have a variety of different internal structures, as shown in FIGS. 3C-10 in the following of the present disclosure. In addition, according to the aspects of the present disclosure, the first light-transmitting layer 220 and the second light-transmitting layer 230 may be dielectrics such as silicon dioxide (SiO2), silicon nitride (SiN), resin polymer or photoresist.

Furthermore, according to the aspects of the present disclosure, a plurality of photosensitive regions 240 separated from each other are arranged on the photosensitive surface under the optical system 200, and the photosensitive regions 240 are surrounded by a non-photosensitive region 241. As shown in FIG. 3B, four photosensitive regions 240 are shown, and each photosensitive region 240 is numbered as 1, 2, 3 and 4, respectively.

According to the aspects of the present disclosure, the optical system 200 is used to form a plurality of light spots on the plurality of photosensitive regions 240 separated from each other. Each photosensitive region 240 may be formed by a photosensitive device(s), which may be a photodiode(s) or a single-photon avalanche diode(s) (SPADs), and the photosensitive region 240 may be a region covered by the photodiode(s) or the single-photon avalanche diode(s) (SPADs), or may be an active (light receiving) region of the photodiode(s) or the single-photon avalanche diode(s) (SPADs).

According to the aspects of the present disclosure, as shown by the black solid lines with arrow in FIG. 3A, the first light-transmitting layer 220 is used to refract the converged first light beam into a plurality of second light beams, which are used to form a plurality of light spots on the plurality of photosensitive regions 240, where each of the plurality of light spots covers a part of the plurality of photosensitive regions. It should be understood that the plurality of second light beams may be light beams completely separated from each other, or may be light beams with partial overlapping areas. Therefore, in order to highlight the contrast of light spot shape, the formation of the light spots by the optical system shown in FIG. 2A is shown in FIG. 3A by gray dotted lines (i.e., the same as the black dotted lines in FIG. 2A), and the light beams represented by black solid lines with arrow in FIG. 3A are all incident on respective photosensitive regions 240, so that when the amount of light incident on the lens 210 is the same, more light is incident on the photosensitive regions 240, while the light incident on the non-photosensitive region 241 is reduced as much as possible.

According to the aspects of the present disclosure, the second light-transmitting layer 230 is located under the first light-transmitting layer 220, and the second light beams are respectively incident on the plurality of photosensitive regions 240 through the second light-transmitting layer 230 to form the plurality of light spots on the plurality of photosensitive regions 240.

According to the aspects of the present disclosure, the number of second light beams, the number of photosensitive regions and the number of light spots can be equal, for example, they are all 2, 3, 4, 6, etc. Alternatively, the number of second light beams is equal to the number of light spots, but less than the number of photosensitive regions, for example, the number of second light beams is 2, and the number of photosensitive regions is 4.

FIG. 3B schematically shows position relationship between four photosensitive regions 240 and four light spots 250 formed by the optical system 200. As shown in FIG. 3B, after the incident first light beam passes through the optical system 200, four separated second light beams can be formed, and the four separated second light beams are respectively incident on four photosensitive regions 240 to form four light spots 250, wherein each light spot 250 covers one photosensitive region 240, and the amount of light incident on the non-photosensitive region 241 is very small, so the optical system 200 according to the aspects of present disclosure can improve the efficiency of light sensing.

According to the aspects of the present disclosure, the first light-transmitting layer may include a first dielectric layer and a second dielectric layer, the first dielectric layer is attached to the second dielectric layer, and the first dielectric layer is interposed between the lens and the second dielectric layer. The upper surface of the second dielectric layer is provided with at least one convex structure or at least one concave structure, and each of the at least one convex structure or the at least one concave structure refracts the light incident on its light-incident surface, so that the converged first light beam is refracted (i.e., dispersed) into a plurality of second light beams. Alternatively, the lower surface of the second dielectric layer may also be provided with at least one convex structure or at least one concave structure, and each of the at least one convex structure or at least one concave structure refracts the light to be emitted from its light-emitting surface, so that the converged first light beam is refracted (i.e., dispersed) into a plurality of second light beams. Through the convex structure or the concave structure, the first light beam can more accurately form light spots on the plurality of photosensitive regions.

Figure 3C:
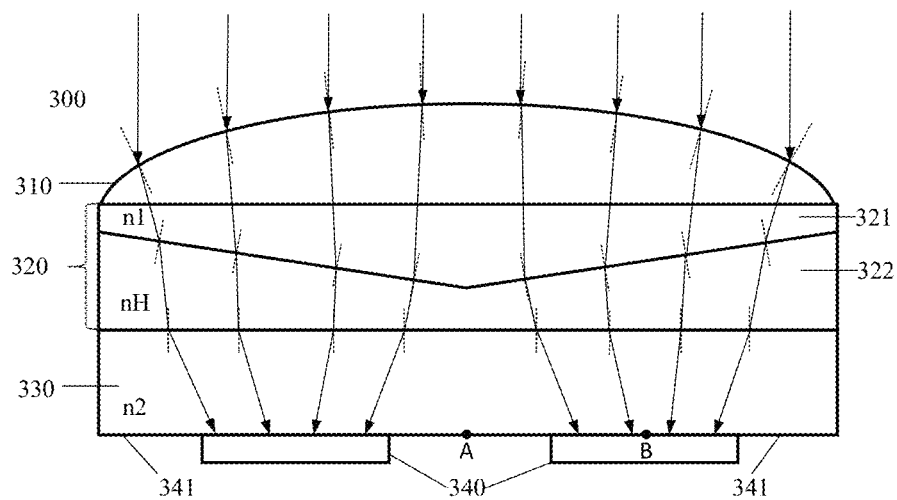
FIG. 3C shows a schematic cross-sectional side view of an example implementation of the optical system shown in FIG. 3A according to an aspect of the present disclosure.
Figure 3D:
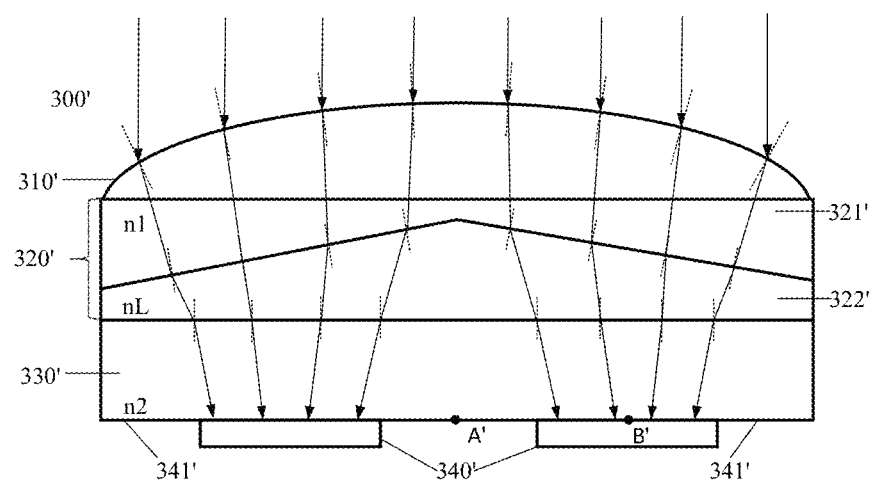
FIG. 3D shows a schematic cross-sectional side view of another example implementation of the optical system shown in FIG. 3A according to an aspect of the present disclosure.

FIG. 3C shows a schematic cross-sectional side view of an example implementation of the optical system shown in FIG. 3A according to an aspect of the present disclosure, and FIG. 3D shows a schematic cross-sectional side view of another example implementation of the optical system shown in FIG. 3A according to an aspect of the present disclosure.

As shown in FIG. 3C, the optical system 300 includes a lens 310, a first light-transmitting layer 320 and a second light-transmitting layer 330. On the photosensitive surface under the optical system 300, a plurality of photosensitive regions 340 separated from each other are arranged, and the photosensitive regions 340 are surrounded by a non-photosensitive region 341.

As shown in FIG. 3C, the first light-transmitting layer 320 includes a first dielectric layer 321 and a second dielectric layer 322, and the first dielectric layer 321 is attached to the second dielectric layer 322. The upper surface of the second dielectric layer 322 is provided with a concave structure, which may be a centrosymmetric structure. Through the concave structure of the upper surface of the second dielectric layer 322, the incident first light beam can be refracted into a plurality of second light beams. For example, as shown in FIG. 3C, the first dielectric layer 321 may have the same refractive index as the lens 310. In this case, after the first light beam is refracted and converged at the light-incident surface of the lens 310, the refracted and converged first light beam is transmitted to the interface between the first dielectric layer 321 and the second dielectric layer 322, and refracted again, so that the first light beam is refracted to form a plurality of second light beams. Then, the plurality of second light beams are refracted again at the interface between the second dielectric layer 322 and the second light-transmitting layer 330, and are then incident on the plurality of photosensitive regions 340 separated from each other to form the plurality of light spots.

As shown in FIG. 3C, each of the plurality of light spots cannot cover all the photosensitive regions alone, but only a part of the plurality of photosensitive regions 340, for example, at least one photosensitive region. For example, the plurality of photosensitive regions 340 include four photosensitive regions, such as the four photosensitive regions in FIG. 3B, and the optical system 300 can form four light spots, and each of the four light spots irradiates one photosensitive region different from each other. Alternatively, the plurality of light spots may include two strip-shaped light spots, and each of the two strip-shaped light spots irradiates two photosensitive regions which are different from the two photosensitive regions irradiated by the other strip-shaped light spot, for example, one stripe-shaped light spot irradiates the photosensitive regions numbered as 1 and 3, and the other stripe-shaped light spot irradiates the photosensitive regions numbered as 2 and 4. Optionally, the number of the plurality of photosensitive regions may include 2, 4, 8, etc.

According to the aspects of the present disclosure, in the case where the upper surface of the second dielectric layer 322 is provided with a concave structure, the refractive index $n_H$ of the second dielectric layer 322 is greater than the refractive index $n_1$ of the first dielectric layer 321 and is greater than the refractive index $n_2$ of the second light-transmitting layer 330. For example, the value of $n_2$ is 1.5. Preferably, the refractive index of the first dielectric layer 321 is equal to or approximately equal to or greater than the refractive index of the lens 310.

According to the aspects of the present disclosure, the greater the difference between the refractive index $n_H$ of the second dielectric layer 322 and the refractive index $n_1$ of the first dielectric layer 321 is, the greater the deviation distance between the center (as shown by point A in FIG. 3C) of the light spot that would be formed by the converged first light beam and the center (as shown by point B in FIG. 3C) of the light spot that would be formed by a single second light beam is. Similarly, the greater the difference between the refractive index $n_H$ of the second dielectric layer 322 and the refractive index $n_2$ of the second light-transmitting layer 330 is, the greater the deviation distance between the center (point A) of the light spot that would be formed by the converged first light beam and the center (point B) of the light spot that would be formed by the single second light beam is.

As shown in FIG. 3D, the optical system 300' includes a lens 310', a first light-transmitting layer 320' and a second light-transmitting layer 330'. A plurality of photosensitive regions 340' separated from each other are arranged on the photosensitive surface of the optical system 300', and the photosensitive regions 340' are surrounded by a non-photosensitive region 341'.

As shown in FIG. 3D, the first light-transmitting layer 320' includes a first dielectric layer 321' and a second dielectric layer 322', and the first dielectric layer 321' is attached to the second dielectric layer 322'. The upper surface of the second dielectric layer 322' is provided with a convex structure. For example, the convex structure is a structure obtained by inverting the concave structure shown in FIG. 3C, which may be a centrosymmetric structure. Through the convex structure of the upper surface of the second dielectric layer 322', the incident first light beam can be refracted into a plurality of second light beams. For example, as shown in FIG. 3D, the first dielectric layer 321' may have the same refractive index as the lens 310'. In this case, after the first light beam is refracted and converged at the light-incident surface of the lens 310', the refracted and converged first light beam is transmitted to the interface between the first dielectric layer 321' and the second dielectric layer 322' and refracted again at the interface, so that the first light beam is refracted to form a plurality of second light beams. Then, the plurality of second light beams are refracted again at the interface between the second dielectric layer 322' and the second light-transmitting layer 330', and are then incident on the plurality of photosensitive regions 340' separated from each other to form the plurality of light spots.

As shown in FIG. 3D, each of the plurality of light spots cannot cover all the photosensitive regions alone, but only a part of the plurality of photosensitive regions 340', for example, at least one photosensitive region. For example, the plurality of photosensitive regions 340' include four photosensitive regions, such as the four photosensitive regions in FIG. 3B, and the optical system 300' can form four light spots, each of the four light spots irradiates one photosensitive region different from each other. Alternatively, the plurality of light spots include two stripe-shaped light spots, and each of the two stripe-shaped light spots irradiates two photosensitive regions which are different from the two photosensitive regions irradiated by the other strip-shaped light spot, for example, one stripe-shaped light spot irradiates the photosensitive regions numbered as 1 and 3, and the other stripe-shaped light spot irradiates the photosensitive regions numbered as 2 and 4. Optionally, the number of the plurality of photosensitive regions may include 2, 4, 8, etc.

According to the aspects of the present disclosure, in the case where the upper surface of the second dielectric layer 322' is provided with a convex structure, the refractive index $n_L$ of the second dielectric layer 322' is smaller than the refractive index $n_1$ of the first dielectric layer 321' and is smaller than the refractive index $n_2$ of the second light-transmitting layer 330'. For example, the value of $n_2$ is 1.5. Preferably, the refractive index of the first dielectric layer 321' is equal to or approximately equal to or smaller than the refractive index of the lens 310'. Alternatively, the refractive index $n_L$ of the second dielectric layer 322' is greater than the refractive index $n_1$ of the first dielectric layer 321' and is smaller than the refractive index $n_2$ of the second light-transmitting layer 330'.

According to the aspects of the present disclosure, the greater the difference between the refractive index $n_L$ of the second dielectric layer 322' and the refractive index $n_1$ of the first dielectric layer 321' is, the greater the deviation distance between the center (as shown by point A' in FIG. 3D) of the light spot that would be formed by the converged first light beam and the center (as shown by point B' in FIG. 3D) of the light spot that would be formed by a single second light beam is. Similarly, the greater the difference between the refractive index $n_L$ of the second dielectric layer 322' and the refractive index $n_2$ of the second light-transmitting layer 330' is, the greater the deviation distance between the center (point A') of the light spot that would be formed by the converged first light beam and the center (point B') of the light spot that would be formed by the single second light beam is.

Figure 3E:
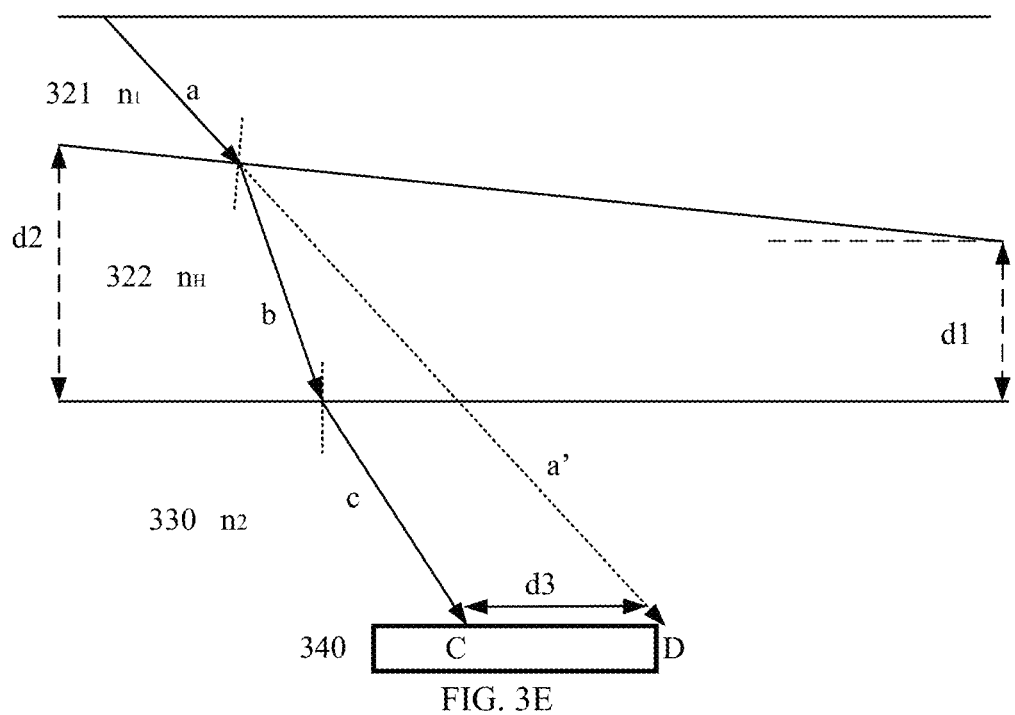
FIG. 3E shows a schematic diagram of a deviation distance in the optical system shown in FIG. 3C according to an aspect of the present disclosure.

FIG. 3E shows a schematic diagram of the deviation distance in the optical system 300 in FIG. 3C according to an aspect of the present disclosure. For clarity, only one incident light ray is shown schematically in FIG. 3E, which passes through the first dielectric layer 321, the second dielectric layer 322 and the second light-transmitting layer 330 in turn, and finally reaches the photosensitive region 340.

Specifically, as shown in FIG. 3E, assuming that the second dielectric layer 322 and the second light-transmitting layer 330 have the same refractive index as the first dielectric layer 321, the propagation direction of the light ray 'a' incident on the light-incident surface of the second dielectric layer 322 does not change, and it continues to propagate along the direction indicated by the dotted light ray 'a'' and finally reaches the point D on the photosensitive surface.

According to the aspects of the present disclosure, a concave structure is formed onto the upper surface of the second dielectric layer 322, and the refractive index $n_H$ of the second dielectric layer 322 is greater than the refractive index $n_1$ of the first dielectric layer 321 and greater than the refractive index $n_2$ of the second light-transmitting layer 330, so that the light ray 'a' is refracted at the light-incident surface of the second dielectric layer 322 as the light ray 'b', and then the light ray 'b' is refracted at the light-incident surface of the second light-transmitting layer 330 as the light ray 'c', and finally reaches the point C on the photosensitive surface.

As shown in FIG. 3E, d2 is the thickness of the second dielectric layer 322 near the outside of the optical system 300 (i.e., the leftmost part in FIG. 3C), d1 is the thickness of the second dielectric layer 322 near the center of the optical system 300 (i.e., the middle position in FIG. 3C), and d3 is the deviation distance between point C and point D.

For the aspect of the present disclosure shown in FIG. 3C, when the refractive index $n_1$ of the first dielectric layer 321 and the refractive index $n_2$ of the second light-transmitting layer 330 are fixed, the greater the refractive index $n_H$ of the second dielectric layer 322 is, that is, the greater the difference between the refractive index $n_H$ of the second dielectric layer 322 and the refractive index $n_1$ of the first dielectric layer 321 is, or the greater the difference between the refractive index $n_H$ of the second dielectric layer 322 and the refractive index $n_2$ of the second light-transmitting layer 330 is, the greater the deviation distance d3 between point C and point D is. Specifically, the greater the difference between the refractive index $n_H$ of the second dielectric layer 322 and the refractive index $n_1$ of the first dielectric layer 321 is, the greater the angle between the light ray 'b' and the light ray 'a'' is, thus making the deviation distance d3 greater. Based on the diagram of FIG. 3E, it is easy to understand that for light rays with different positions and different incident angles, they will be refracted to different positions and have different deviation distances, so that all the light rays in the light beams will eventually form a plurality of light spots.

In addition, as shown in FIG. 3E, when the slope of the lateral face of the concave structure of the upper surface of the second dielectric layer 322 increases, that is, when the difference between d2 and d1 increases, the deviation distance d3 between the formed point C and point D will also increase. In other words, the greater the concave degree of the concave structure of the upper surface of the second dielectric layer 322 is, the greater the deviation distance d3 between the point C and the point D is.

It should be understood that based on the schematic diagram of the deviation distance in the optical system 300 in FIG. 3C shown in FIG. 3E, those skilled in the art can also easily understand that for the optical system 300' in FIG. 3D, the deviation distance between the center point of the optical system 300' and the center point of each second light beam can be similarly determined.

It should be understood that, as an example, the concave structure or convex structure of the second dielectric layer 322, 322' in FIGS. 3C and 3D is illustrated as being at/on the upper surface of the second dielectric layer 322, 322', but the present disclosure is not limited to this. According to the aspects of the present disclosure, the concave structure or the convex structure can also be arranged at/on the lower surface of the second dielectric layer, and the same effect can be achieved. Hereinafter, the aspect of providing the concave structure or the convex structure at/on the lower surface of the second dielectric layer will be described with reference to FIGS. 9A and 9B. It should be understood that, a concave structure or a convex structure is provided on/at the upper surface or the lower surface of the second dielectric layer means that the upper surface or the lower surface of the second dielectric layer is provided with or has the concave structure or the convex structure.

According to the aspects of the present disclosure, each structure of at least one convex structure or at least one concave structure arranged on the upper surface or lower surface of the second dielectric layer may be a polygonal pyramid, and the number of lateral faces of each polygonal pyramid is equal to the number of the plurality of photosensitive regions.

According to the aspects of the present disclosure, each structure of at least one convex structure or at least one concave structure arranged on the upper surface or lower surface of the second dielectric layer may be a polygonal prism, and the number of lateral faces used for light refraction of each polygonal prism is related to the number of the plurality of photosensitive regions.

Next, a case where one concave structure or one convex structure is provided on the second dielectric layer will be described with reference to FIGS. 4A-4E and 5A-5C.

Figure 4A:
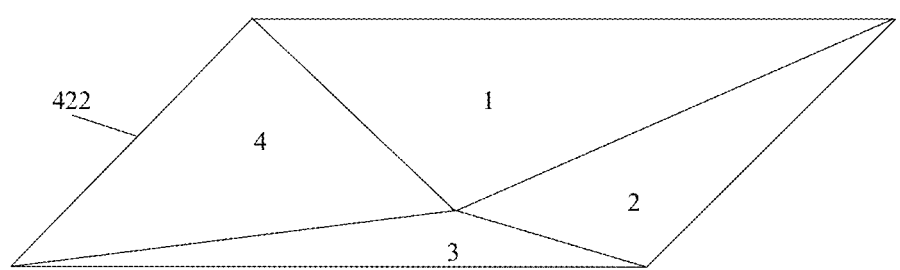
FIG. 4A shows a schematic perspective view of an example second dielectric layer being provided with a concave structure according to an aspect of the present disclosure.

FIG. 4A shows a schematic perspective view of a second dielectric layer 422 being provided with a concave structure according to an aspect of the present disclosure. As shown in FIG. 4A, the concave structure is a concave quadrangular pyramid structure, which can be a centrosymmetric structure, and the concave quadrangular pyramid structure is used to generate four light spots. In FIG. 4A, the four lateral faces of the concave quadrangular pyramid structure are numbered as 1, 2, 3 and 4, respectively.

Figure 4B:
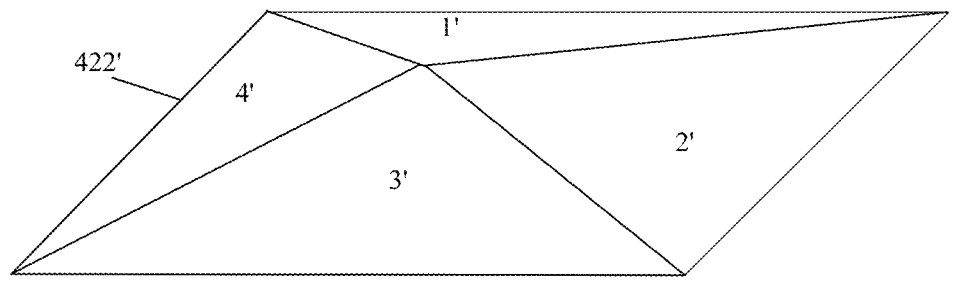
FIG. 4B shows a schematic perspective view of an example second dielectric layer being provided with a convex structure according to an aspect of the present disclosure.

FIG. 4B shows a schematic perspective view of a second dielectric layer 422' being provided with a convex structure according to an aspect of the present disclosure. As shown in FIG. 4B, the convex structure is a convex quadrangular pyramid structure, which can be a structure obtained by inverting the concave structure shown in FIG. 4A and also a centrosymmetric structure, and the convex quadrangular pyramid structure is used to generate four light spots. In FIG. 4B, the four lateral faces of the convex quadrangular pyramid structure are numbered as 1', 2', 3' and 4' respectively.

Figure 4C:
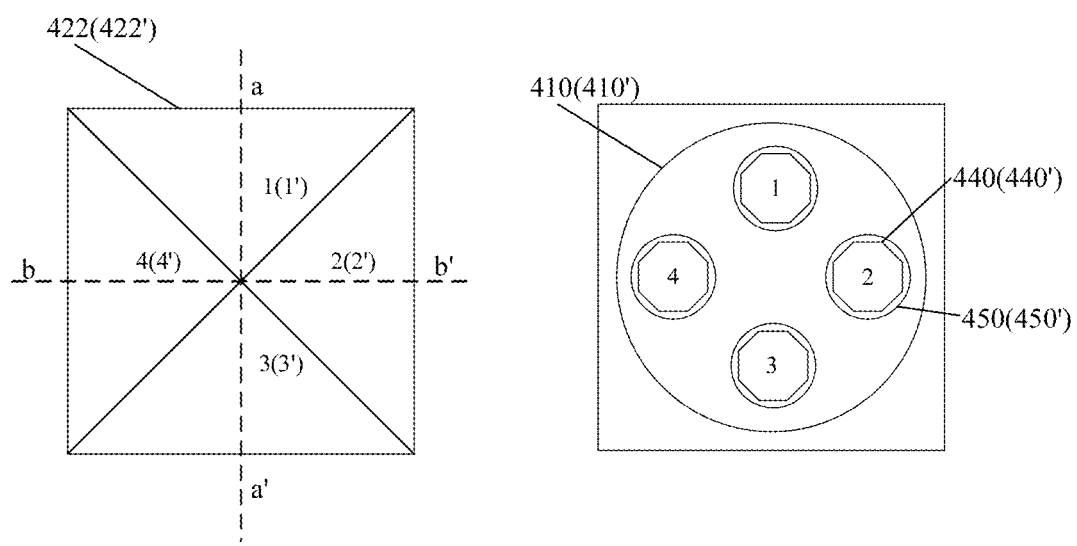
FIG. 4C shows a schematic top view of the second dielectric layer shown in FIGS. 4A and 4B and the positions of the formed light spots according to an aspect of the present disclosure.
Figure 4D:
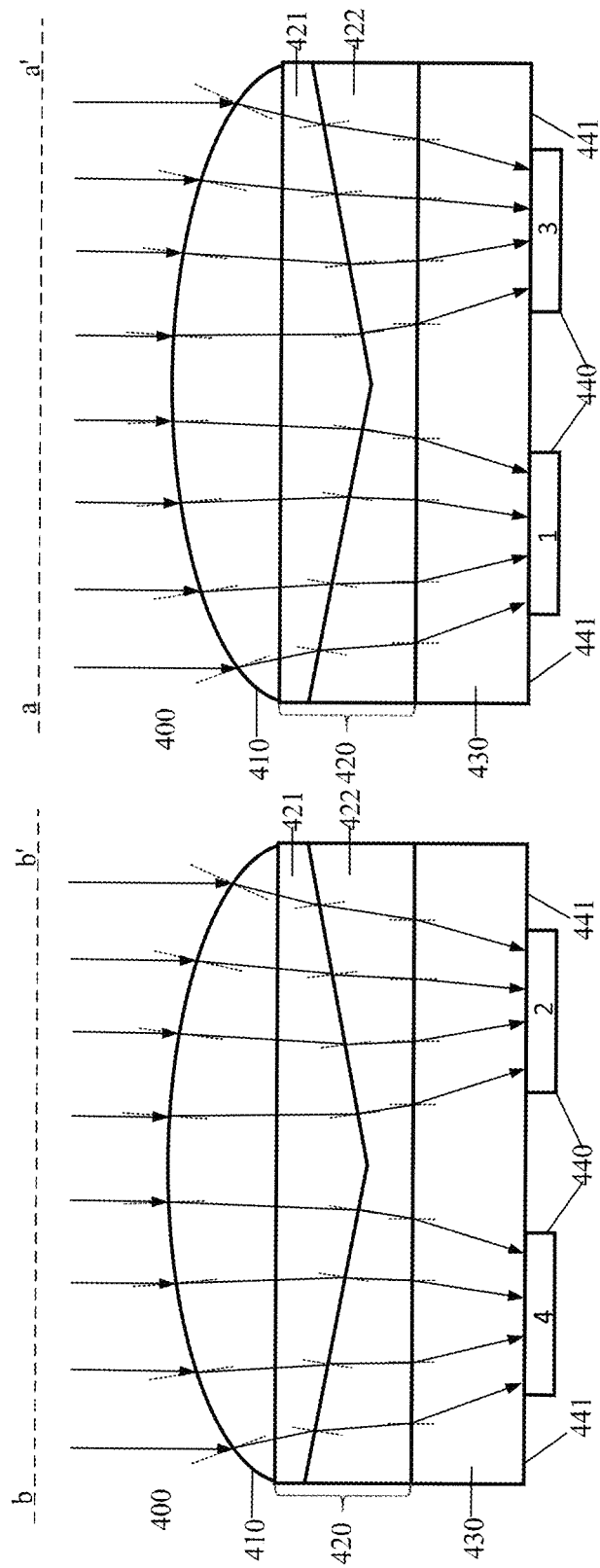
FIG. 4D shows a schematic cross-sectional side view illustrating the formation of the light spots when the optical system adopts the second dielectric layer shown in FIG. 4A according to an aspect of the present disclosure.
Figure 4E:
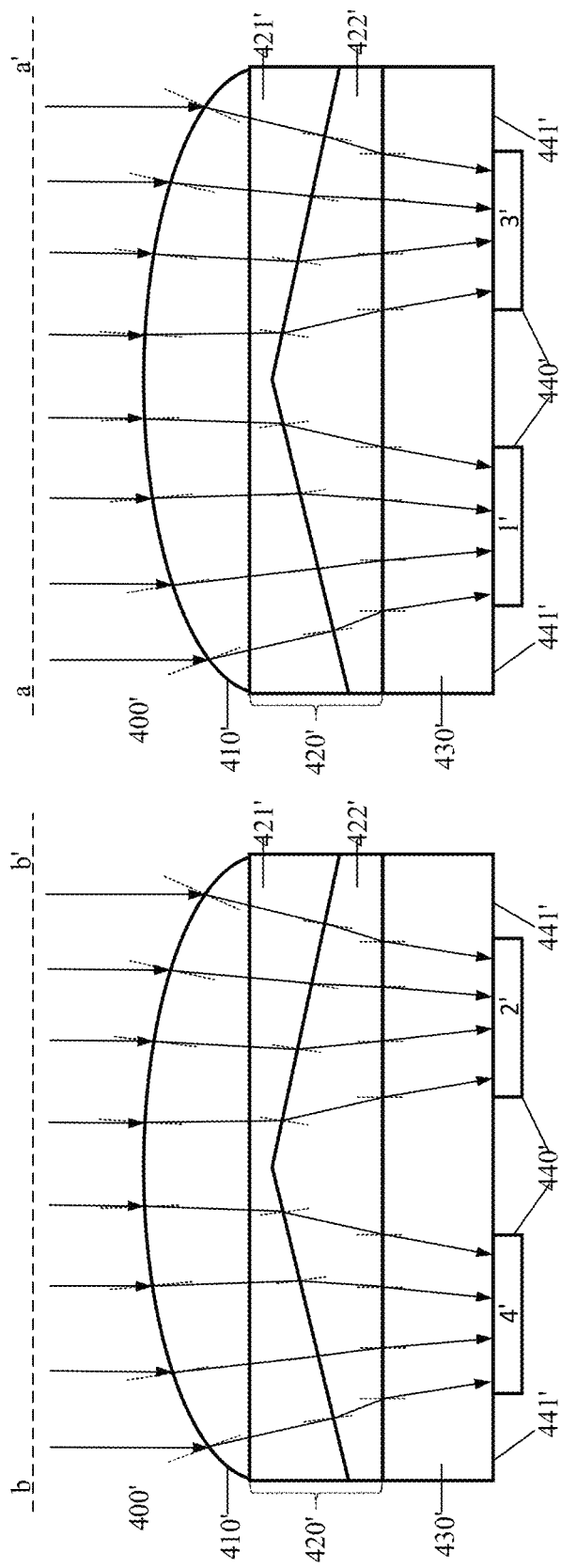
FIG. 4E shows a schematic cross-sectional side view illustrating the formation of the light spots when the optical system adopts the second dielectric layer shown in FIG. 4B according to an aspect of the present disclosure.

FIG. 4D shows an optical system 400 including a second dielectric layer being provided with a concave structure as shown in FIG. 4A, and FIG. 4E shows an optical system 400' including a second dielectric layer being provided with a convex structure as shown in FIG. 4B. As shown in FIGS. 4D and 4E, corresponding to the optical systems 400 and 400', photosensitive regions 440 and 440' are provided, respectively.

FIG. 4C shows the correspondence relationship between respective lateral faces 1 (1'), 2 (2'), 3 (3') and 4 (4') of the quadrangular pyramid structure and respective photosensitive regions 440 (440'). Specifically, the left figure of FIG. 4C shows the top view of the concave structure shown in FIG. 4A and the convex structure shown in FIG. 4B. Similar to FIGS. 4A and 4B, the four lateral faces of the concave (convex) quadrangular pyramid structure are respectively numbered as 1 (1'), 2 (2'), 3 (3') and 4 (4') in the left figure of FIG. 4C. In the right figure of FIG. 4C, a lens 410 (410') and four photosensitive regions 440 (440') are shown. The four photosensitive regions 440 (440') are numbered as 1, 2, 3 and 4, respectively, and correspond to the four lateral faces of the concave (convex) structure of the second dielectric layer 422 (422') in the left figure of FIG. 4C. In addition, the right figure of FIG. 4C also shows four light spots 450 (450') formed by the concave structure of FIG. 4A and the convex structure of FIG. 4B, and each light spot 450 (450') covers one corresponding photosensitive region 440 (440').

Specifically, FIG. 4D shows a schematic cross-sectional side view illustrating the formation of the light spots by the optical system 400 along the lines aa' and bb' in the left figure of FIG. 4C, respectively. FIG. 4E shows a schematic cross-sectional side view illustrating the formation of the light spots by the optical system 400' along the lines aa' and bb' in the left figure of FIG. 4C, respectively. The optical systems 400 and 400' may each be an optical system used for a single optical sensing unit.

As shown in FIG. 4D, the optical system 400 includes a lens 410, a first light-transmitting layer 420 and a second light-transmitting layer 430. On the photosensitive surface under the optical system 400, a plurality of photosensitive regions 440 separated from each other are arranged, and the photosensitive regions 440 are surrounded by a non-photosensitive region 441. As shown in FIG. 4D, the first light-transmitting layer 420 includes a first dielectric layer 421 and a second dielectric layer 422, and the first dielectric layer 421 is attached to the second dielectric layer 422. The second dielectric layer 422 is the second dielectric layer 422 as shown in FIG. 4A, and its upper surface has a concave quadrangular pyramid structure. As shown in the left figure of FIG. 4D, light spots are formed on the photosensitive regions 440 numbered as 4 and 2, respectively, through the lateral faces 4 and 2 of the concave quadrangular pyramid structure of the upper surface of the second dielectric layer 422. As shown in the right figure of FIG. 4D, light spots are formed on the photosensitive regions 440 numbered as 1 and 3, respectively, through the lateral faces 1 and 3 of the concave quadrangular pyramid structure of the upper surface of the second dielectric layer 422.

As shown in FIG. 4E, the optical system 400' includes a lens 410', a first light-transmitting layer 420' and a second light-transmitting layer 430'. A plurality of photosensitive regions 440' separated from each other are arranged on the photosensitive surface under the optical system 400', and the photosensitive regions 440' are surrounded by a non-photosensitive region 441'. As shown in FIG. 4E, the first light-transmitting layer 420' includes a first dielectric layer 421' and a second dielectric layer 422', and the first dielectric layer 421' is attached to the second dielectric layer 422'. The second dielectric layer 422' is the second dielectric layer 422' shown in FIG. 4B, and its upper surface has a convex quadrangular pyramid structure. As shown in the left figure of FIG. 4E, light spots are formed on the photosensitive regions 440' numbered as 4' and 2', respectively, through the lateral faces 4' and 2' of the convex quadrangular pyramid structure of the upper surface of the second dielectric layer 422'. As shown in the right figure of FIG. 4E, light spots are formed on the photosensitive regions 440' numbered as 1' and 3', respectively, through the lateral faces 1' and 3' of the convex quadrangular pyramid structure of the upper surface of the second dielectric layer 422'.

It should be understood that although the formation of light spots under the condition that the single concave structure is a quadrangular pyramid structure is illustrated in conjunction with FIGS. 4A and 4D, and the formation of light spots under the condition that the single convex structure is a quadrangular pyramid structure is illustrated in conjunction with FIGS. 4B and 4E, it should be understood that the single concave structure or convex structure according to the aspects of the present disclosure may be a centrosymmetric polygonal pyramid structure, and the number of lateral faces of the polygonal pyramid may be greater than or equal to 3, and may be equal to the number of photosensitive regions.

Figure 5A:
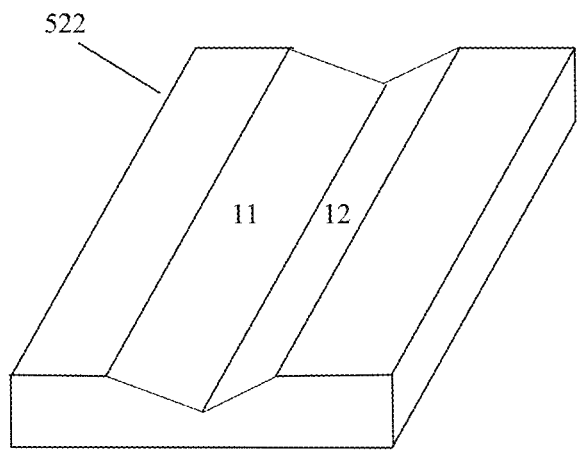
FIG. 5A shows a schematic perspective view of another example second dielectric layer being provided with a concave structure according to an aspect of the present disclosure.

FIG. 5A shows a schematic perspective view of another example second dielectric layer 522 being provided with a concave structure according to an aspect of the present disclosure. As shown in FIG. 5A, the concave structure is a concave triangular prism structure, which is axisymmetric and has two prism faces (hereinafter simply referred to as lateral faces) 11 and 12 for light refraction. The concave triangular prism structure is used to generate two stripe-shaped light spots 550.

It should be understood that the side cross-sectional view of the optical system 500 (not shown) including the second dielectric layer 522 shown in FIG. 5A is the same as that of the optical system 300 shown in FIG. 3C, and will not be shown here. Therefore, the optical system 500 may include a lens 510, a first light-transmitting layer 520 (not shown) and a second light-transmitting layer 530 (not shown). On the photosensitive surface under the optical system 500, a plurality of photosensitive regions 540 separated from each other are arranged, and the photosensitive regions 540 are surrounded by a non-photosensitive region 541 (not shown). Furthermore, the first light-transmitting layer 520 (not shown) includes a first dielectric layer 521 (not shown) and a second dielectric layer 522, which is the second dielectric layer 522 as shown in FIG. 5A. The optical system 500 may be an optical system used for a single optical sensing unit.

Figure 5B:
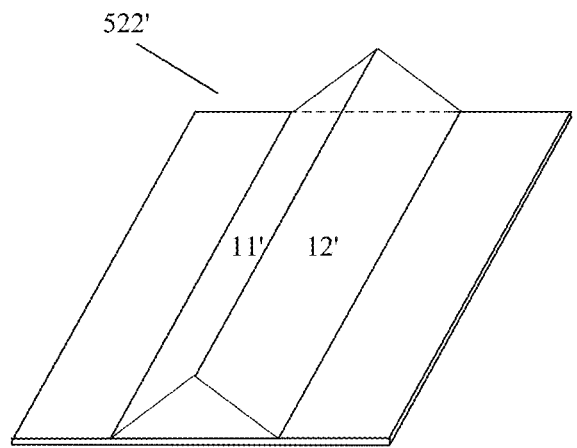
FIG. 5B shows a schematic perspective view of another example second dielectric layer being provided with a convex structure according to an aspect of the present disclosure.

FIG. 5B shows a schematic perspective view of another second dielectric layer 522' being provided with a convex structure according to an aspect of the present disclosure. As shown in FIG. 5B, the convex structure is a convex triangular prism structure, which is axisymmetric and has two lateral faces (hereinafter referred to as lateral faces) 11' and 12' for light refraction. The convex triangular prism structure is used to generate two stripe-shaped light spots 550'.

It should be understood that the side cross-sectional view of the optical system 500' (not shown) including the second dielectric layer 522' shown in FIG. 5B is the same as that of the optical system 300' shown in FIG. 3D, and will not be shown here. Therefore, the optical system 500' may include a lens 510', a first light-transmitting layer 520' (not shown) and a second light-transmitting layer 530' (not shown). A plurality of photosensitive regions 540' separated from each other are arranged on the photosensitive surface under the optical system 500', and the photosensitive regions 540' are surrounded by a non-photosensitive region 541' (not shown). Furthermore, the first light-transmitting layer 520' (not shown) includes a first dielectric layer 521' (not shown) and a second dielectric layer 522', which is the second dielectric layer 522' as shown in FIG. 5B. The optical system 500' may be an optical system used for a single optical sensing unit.

Figure 5C:
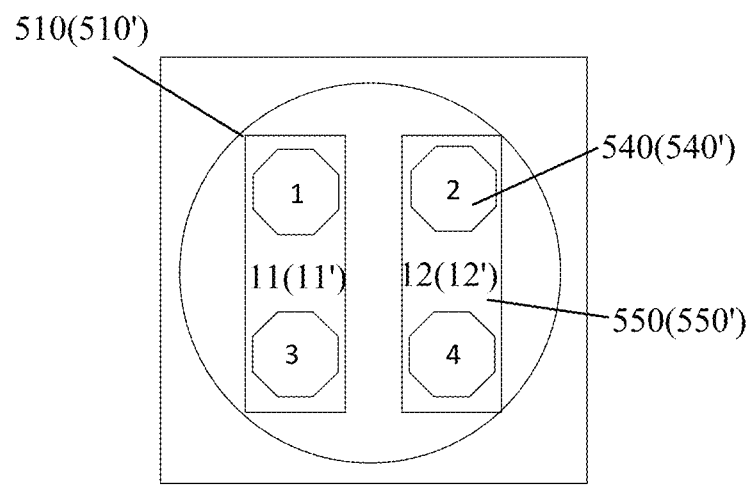
FIG. 5C shows a schematic top view of the positions of the formed light spots when the optical system adopts the second dielectric layer shown in FIGS. 5A and 5B according to an aspect of the present disclosure.

FIG. 5C shows a lens 510 (510') and four photosensitive regions 540 (540'). In FIG. 5C, four photosensitive regions are numbered as 1, 2, 3, and 4, respectively, and two stripe-shaped light spots 550 (550') are numbered as 11 (11') and 12 (12'), respectively. Among them, two stripe-shaped light spots 550 numbered as 11 and 12 are generated by two lateral faces 11 and 12 of the concave triangular prism structure of the second dielectric layer 522 shown in FIG. 5A, and two stripe-shaped light spots 550' numbered as 11' and 12' are generated by two lateral faces 11' and 12' of the convex triangular prism structure of the second dielectric layer 522' shown in FIG. 5B, respectively. It can be seen from FIG. 5C that the light spot 11 (11') covers the two photosensitive regions 540 (540') numbered as 1 and 3, and the light spot 12 (12') covers the two photosensitive regions 540 (540') numbered as 2 and 4.

It should be understood that although the formation of light spots under the condition that the single concave structure is a triangular prism structure is illustrated in conjunction with FIG. 5A, and the formation of light spots under the condition that the single convex structure is a triangular prism structure is illustrated in conjunction with FIG. 5B, it should be understood that the single concave structure or convex structure according to the aspects of the present disclosure may be an axisymmetric polygonal prism structure, and the number of lateral faces (i.e., prism faces for light refraction) of the polygonal prism may be greater than or equal to 2, and may be related to the number of photosensitive regions. For example, in the case where the light spot formed through each lateral face covers P photosensitive regions, then when the number of photosensitive regions is Q, the number of lateral faces for light refraction of the polygonal prism is Q/P.

In addition, according to the aspects of the present disclosure, it can be understood that by adjusting the refractive indices of the first dielectric layer, the second dielectric layer and the second light-transmitting layer, and/or by adjusting the size of the concave structure, which may include the inclination angle of the lateral faces of the concave structure and the thickness of the edges of the concave structure, distances between the centers of the plurality of the formed light spots and corresponding sizes of the plurality of the formed light spots can be adjusted for adapting to different photosensitive regions, thereby improving the flexibility of the optical system.

According to the aspects of the present disclosure, in addition to the single concave structure and the single convex structure shown in FIGS. 4A, 4B, 5A and 5B, a plurality of concave structures or convex structures may be formed on the upper surface of the second dielectric layer. For the concave structure shown in FIG. 4A and the convex structure shown in FIG. 4B, a plurality of convex structures or a plurality of concave structures may be arranged in an array of N*M, where N and M are integers greater than or equal to 2, and N is equal to or not equal to M, which will be explained in conjunction with FIGS. 6A and 6B. As for the concave structure shown in FIG. 5A and the convex structure shown in FIG. 5B, a plurality of convex structures or a plurality of concave structures may be arranged in parallel to form a linear array, which will be explained in conjunction with FIGS. 7A and 7B.

Figure 6A:
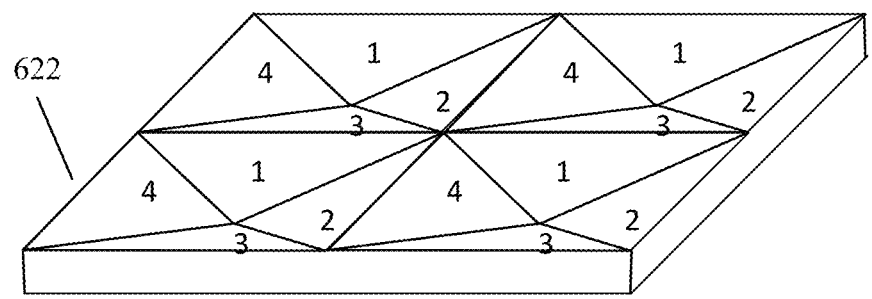
FIG. 6A shows a schematic perspective view of another example second dielectric layer being provided with a plurality of concave structures according to an aspect of the present disclosure.

FIG. 6A shows a schematic perspective view of another example second dielectric layer 622 being provided with concave structures according to an aspect of the present disclosure, which includes an array composed of a plurality of concave structures. As shown in FIG. 6A, the second dielectric layer 622 includes four concave quadrangular pyramid structures, and is used to generate four light spots.

In FIG. 6A, four lateral faces of each concave quadrangular pyramid structure are numbered as 1, 2, 3, and 4, respectively.

Figure 6B:
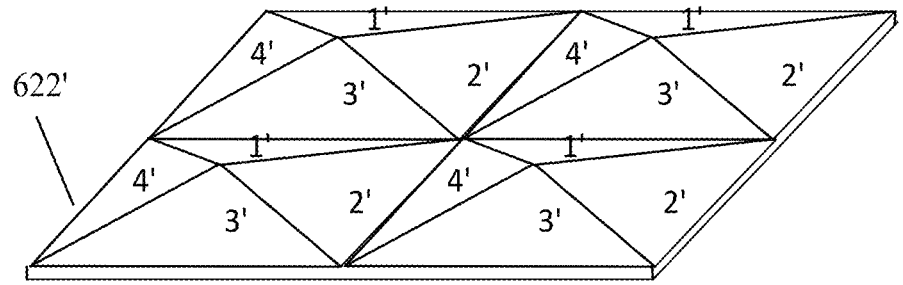
FIG. 6B shows a schematic perspective view of another example second dielectric layer being provided with a plurality of convex structures according to an aspect of the present disclosure.

FIG. 6B shows a schematic perspective view of yet another example second dielectric layer 622' being provided with convex structures according to an aspect of the present disclosure, which includes an array composed of a plurality of convex structures. As shown in FIG. 6B, the second dielectric layer 622' includes four convex quadrangular pyramid structures, and is used to generate four light spots. In FIG. 6B, the four lateral faces of each convex quadrangular pyramid structure are respectively numbered as 1', 2', 3' and 4'.

Figure 6C:
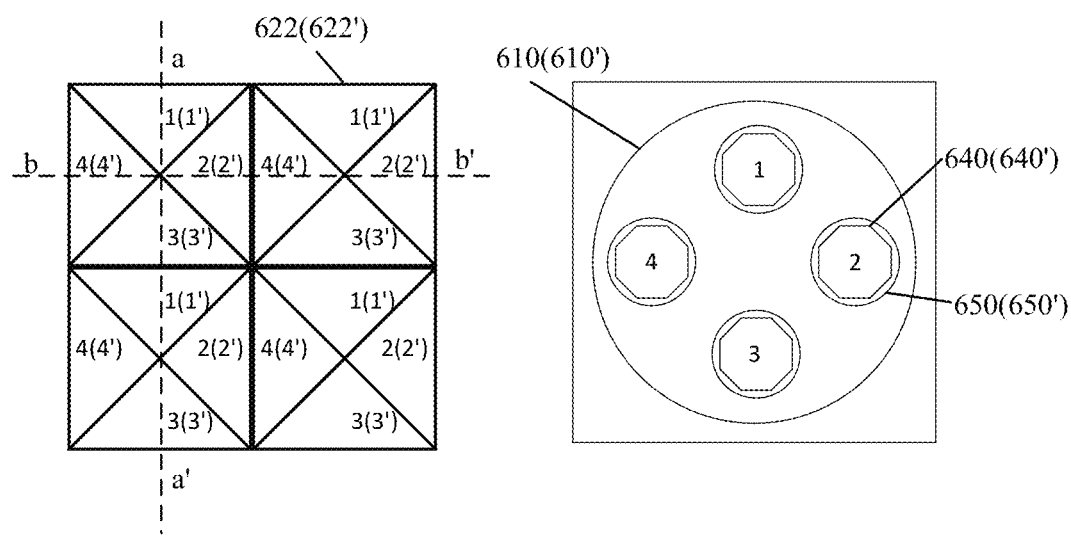
FIG. 6C shows a schematic top view of the second dielectric layer shown in FIGS. 6A and 6B and the positions of the formed light spots according to an aspect of the present disclosure.
Figure 6D:
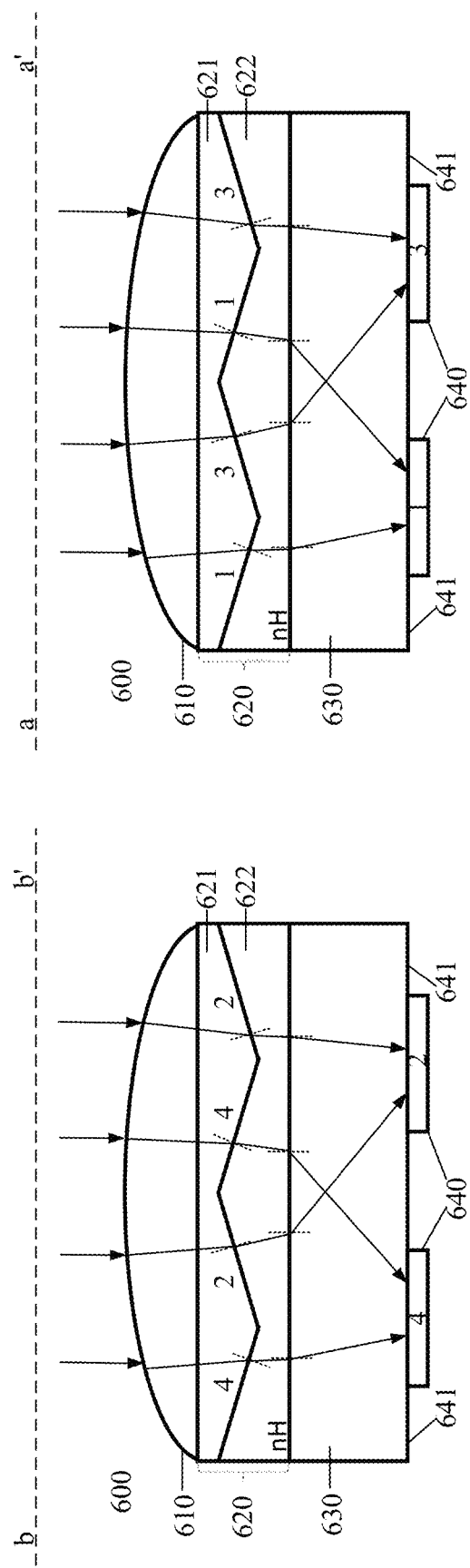
FIG. 6D shows a schematic cross-sectional side view illustrating the formation of the light spots when the optical system adopts the second dielectric layer shown in FIG. 6A according to an aspect of the present disclosure.
Figure 6E:
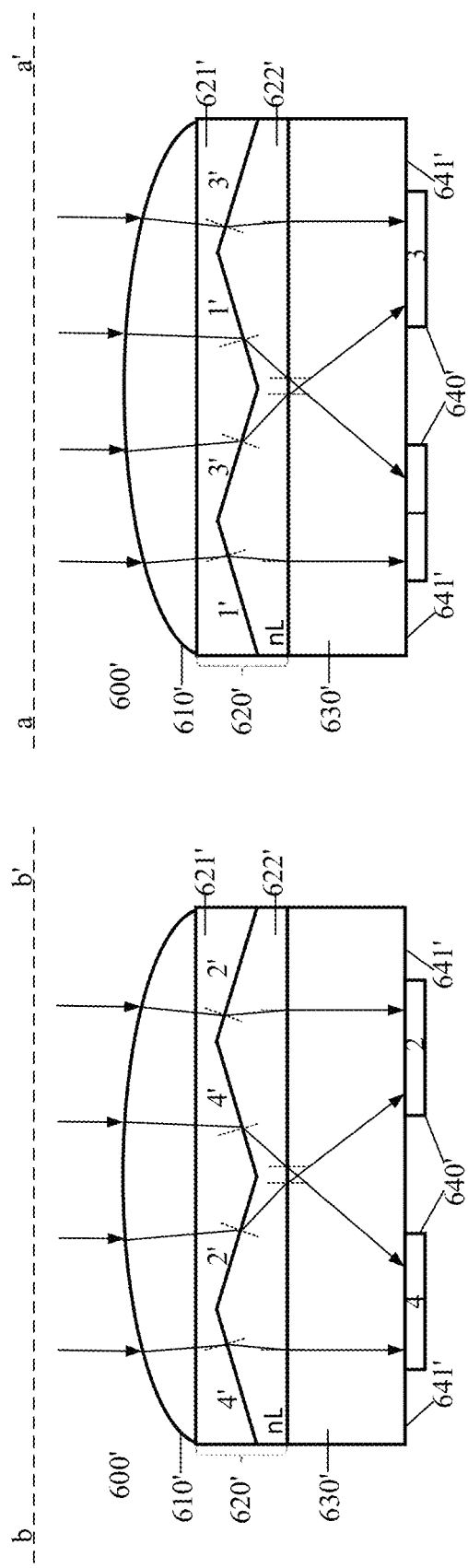
FIG. 6E shows a schematic cross-sectional side view illustrating the formation of the light spots when the optical system adopts the second dielectric layer shown in FIG. 6B according to an aspect of the present disclosure.

FIG. 6D shows an optical system 600 including a second dielectric layer being provided with concave structures as shown in FIG. 6A, and FIG. 6E shows an optical system 600' including a second dielectric layer being provided with convex structures as shown in FIG. 6B. As shown in FIGS. 6D and 6E, corresponding to the optical systems 600 and 600', photosensitive regions 640 and 640' are provided, respectively.

FIG. 6C shows the correspondence relationship between respective lateral faces 1 (1'), 2 (2'), 3 (3') and 4 (4') of the quadrangular pyramid structure and respective photosensitive regions 640 (640'). Specifically, the left figure of FIG. 6C shows the top view of four quadrangular pyramid structures as shown in FIGS. 6A and 6B. Similar to FIGS. 6A and 6B, four lateral faces of each concave (convex) quadrangular pyramid structure are respectively numbered as 1(1'), 2(2'), 3(3') and 4(4') in the left figure of FIG. 6C. In the right figure of FIG. 6C, the lens 610 (610') and the photosensitive regions 640 (640') are shown, and the four photosensitive regions 640 (640') are numbered as 1, 2, 3 and 4, respectively. In addition, the right figure of FIG. 6C also shows four light spots 650 (650') formed by four concave structures of FIG. 6A and four convex structures of FIG. 6B, and each light spot 650 (650') covers one corresponding photosensitive region 640 (640').

Specifically, FIG. 6D shows a schematic cross-sectional side view illustrating the formation of the light spots by the optical system 600 along the lines aa' and bb' in the left figure of FIG. 6C, respectively. FIG. 6E shows a schematic cross-sectional side view illustrating the formation of the light spots by the optical system 600' along the lines aa' and bb' in the left figure of FIG. 6C, respectively. The optical systems 600 and 600' may each be an optical system used for a single optical sensing unit.

As shown in FIG. 6D, the optical system 600 includes a lens 610, a first light-transmitting layer 620 and a second light-transmitting layer 630. On the photosensitive surface under the optical system 600, a plurality of photosensitive regions 640 separated from each other are arranged, and the photosensitive regions 640 are surrounded by a non-photosensitive region 641. As shown in FIG. 6D, the first light-transmitting layer 620 includes a first dielectric layer 621 and a second dielectric layer 622, and the first dielectric layer 621 is attached to the second dielectric layer 622. The second dielectric layer 622 is the second dielectric layer 622 as shown in FIG. 6A. As shown in the left figure of FIG. 6D, a light spot is formed on the photosensitive region 640 numbered as 4 through four lateral faces 4 of four concave structures at the upper surface of the second dielectric layer 622, and a light spot is formed on the photosensitive region 640 numbered as 2 through four lateral faces 2 of four concave structures. Furthermore, as shown in the right figure of FIG. 6D, a light spot is formed on the photosensitive region 640 numbered as 1 through four lateral faces 1 of four concave structures at the upper surface of the second dielectric layer 622, and a light spot is formed on the photosensitive region 640 numbered as 3 through four lateral faces 3 of four concave structures.

As shown in FIG. 6E, the optical system 600' includes a lens 610', a first light-transmitting layer 620' and a second light-transmitting layer 630'. A plurality of photosensitive regions 640' separated from each other are arranged on the photosensitive surface under the optical system 600', and the photosensitive regions 640' are surrounded by a non-photosensitive region 641'. As shown in FIG. 6E, the first light-transmitting layer 620' includes a first dielectric layer 621' and a second dielectric layer 622', and the first dielectric layer 621' is attached to the second dielectric layer 622'. The second dielectric layer 622' is the second dielectric layer 622' as shown in FIG. 6B. As shown in the left figure of FIG. 6E, a light spot is formed on the photosensitive region 640' numbered as 4 through four lateral faces 4' of four convex structures at the upper surface of the second dielectric layer 622', and a light spot is formed on the photosensitive region 640' numbered as 2 through four lateral faces 2' of four convex structures. Furthermore, as shown in the right figure of FIG. 6E, a light spot is formed on the photosensitive region 640' numbered as 1 through four lateral faces 1' of four convex structures at the upper surface of the second dielectric layer 622', and a light spot is formed on the photosensitive region 640' numbered as 3 through four lateral faces 3' of four convex structures.

Furthermore, although the array of concave structures and the array of convex structures are shown as an array of 2*2 in FIGS. 6A and 6B, it should be understood that the aspects of the present disclosure are not limited to this, and the array of concave structures and the array of convex structures may be an array of N*M at the upper surface of the second dielectric layer 322 (322'), where N and M are integers greater than or equal to 2, and N is equal to or not equal to M, for example, both N and M are equal to 3, and the array of concave structures and the array of convex structures may be an array of 3*3 or 4*6. In this case, the number of lateral faces of the polygonal pyramid of each concave/convex structure may be equal to the number of photosensitive regions. It should be understood that the shape of the polygonal pyramid of each concave structure can be different according to the positions of the light spots and the position of the concave structure.

According to the aspects of the present disclosure, the second dielectric layer may have a plurality of convex structures or a plurality of concave structures, which may be arranged in parallel to form a linear array. Each structure of the plurality of convex structures or the plurality of concave structures is an axisymmetric polygonal prism, and the number of lateral faces used for light refraction of each polygonal prism is related to the number of the plurality of photosensitive regions.

Next, an aspect in which a plurality of convex structures or a plurality of concave structures are arranged in a linear array will be described with reference to FIGS. 7A-7E and 8A-8E.

Figure 7A:
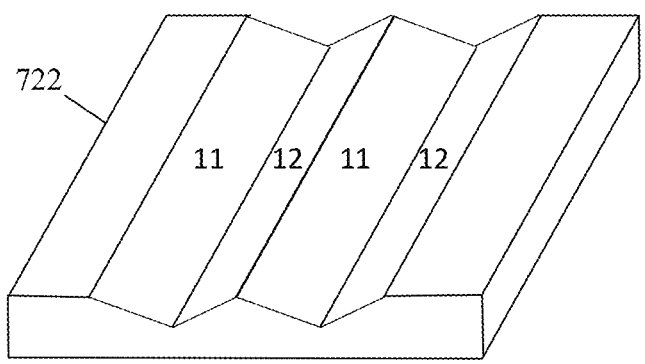
FIG. 7A shows a schematic perspective view of another example second dielectric layer being provided with a plurality of concave structures according to an aspect of the present disclosure.

FIG. 7A shows a schematic perspective view of a second dielectric layer 722 being provided with a plurality of concave structures according to an aspect of the present disclosure, which includes two concave triangular prisms arranged side by side, and two prism faces used for light refraction (hereinafter simply referred to as lateral faces) of each concave triangular prism are numbered as 11 and 12, respectively.

Figure 7B:
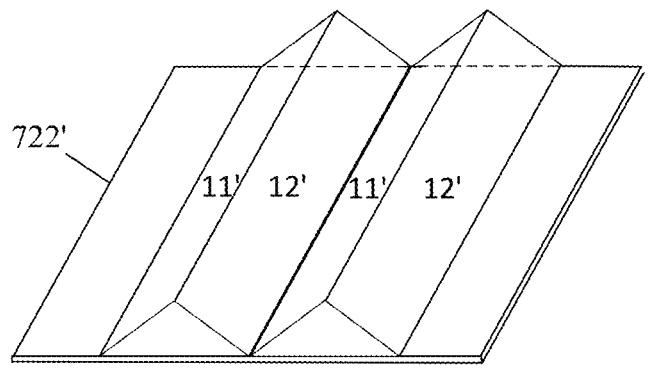
FIG. 7B shows a schematic perspective view of another example second dielectric layer being provided with a plurality of convex structures according to an aspect of the present disclosure.

FIG. 7B shows a schematic perspective view of a second dielectric layer 722' with a plurality of convex structures according to an aspect of the present disclosure, which includes two convex triangular prisms arranged side by side, and two prism faces used for light refraction (hereinafter simply referred to as lateral faces) of each convex triangular prism are numbered as 11' and 12' respectively.

It should be understood that although only two concave structures or two convex structures arranged side by side are shown in FIGS. 7A and 7B, the aspects of the present disclosure is not limited to this, and the number of concave structures or convex structures arranged side by side according to the aspects of the present disclosure may be greater than two.

Figure 7C:
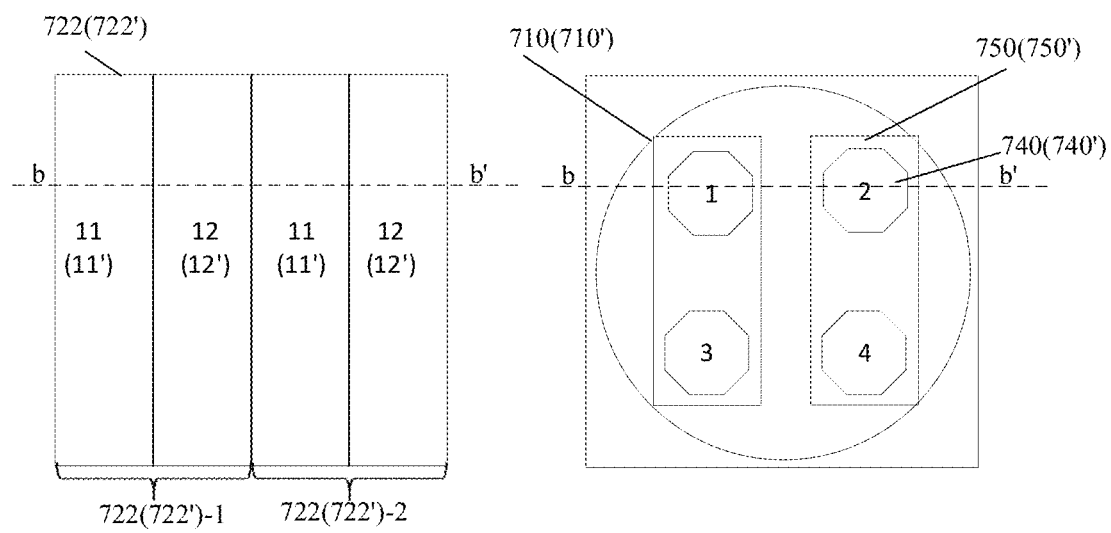
FIG. 7C shows a schematic top view of the second dielectric layer shown in FIGS. 7A and 7B and the positions of the formed light spots according to an aspect of the present disclosure.

FIG. 7C shows the correspondence relationship between respective lateral faces 11 (11') and 12 (12') of the triangular prism structure and respective photosensitive regions 740 (740'). Specifically, the left figure of FIG. 7C shows the top view of the second dielectric layer 722 (722') shown in FIGS. 7A and 7B, in which the triangular prism on the left side in FIGS. 7A and 7B is numbered as 722 (722')-1 and the triangular prism on the right side is numbered as 722 (722')-2. In addition, an example of the arrangement of the photosensitive region 740 (740') and the formed light spots 750 (750') is shown in the right figure of FIG. 7C, where each light spot 750 (750') covers two corresponding photosensitive regions 740 (740'). For clarity, the structure of the second dielectric layer 722 (722') is shown separately in the left figure of FIG. 7C. However, it should be understood that the second dielectric layer 722 (722') should be arranged under the lens 710 (710') shown in the right figure of FIG. 7C. Furthermore, for simplicity, the first dielectric layer and the second light-transmitting layer are not shown in the right figure of FIG. 7C.

Figure 7D:
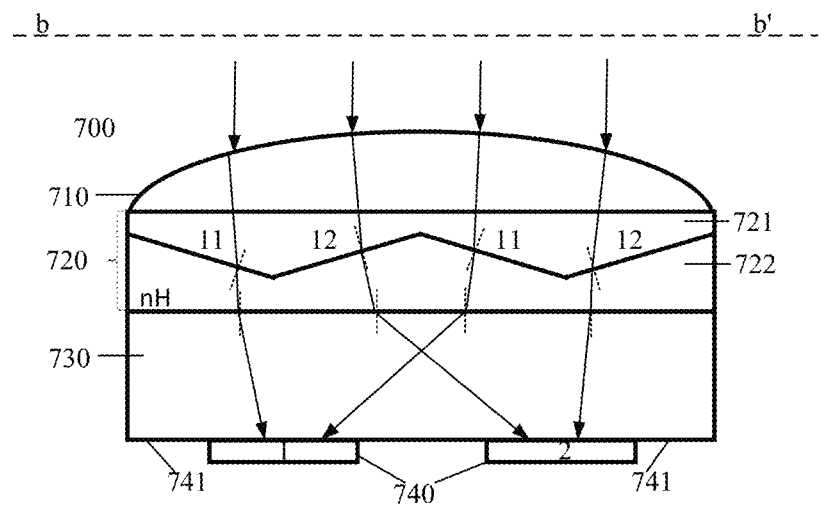
FIG. 7D shows a schematic cross-sectional side view illustrating the formation of the light spots when the optical system adopts the second dielectric layer shown in FIG. 7A according to an aspect of the present disclosure.
Figure 7E:
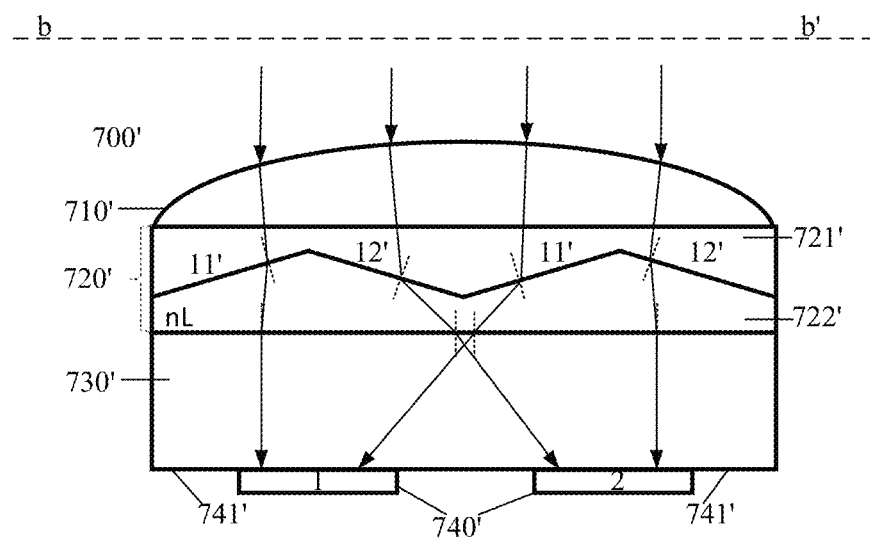
FIG. 7E shows a schematic cross-sectional side view illustrating the formation of the light spots when the optical system adopts the second dielectric layer shown in FIG. 7B according to an aspect of the present disclosure.

FIG. 7D shows a schematic diagram illustrating formation of the light spots of the optical system 700 according to an aspect of the present disclosure, and FIG. 7E shows a schematic diagram illustrating formation of the light spots of the optical system 700' according to an aspect of the present disclosure, which are side cross-sectional views along the line bb' shown in FIG. 7C. The optical systems 700 and 700' may each be an optical system used for a single optical sensing unit.

As shown in FIG. 7D, the optical system 700 includes a lens 710, a first light-transmitting layer 720 and a second light-transmitting layer 730. A plurality of photosensitive regions 740 separated from each other are arranged on the photosensitive surface under the optical system 700, and the photosensitive regions 740 are surrounded by a non-photosensitive region 741. As shown in FIG. 7D, the first light-transmitting layer 720 includes a first dielectric layer 721 and a second dielectric layer 722, and the second dielectric layer 722 has the structure as shown in FIG. 7A.

As shown in FIG. 7E, the optical system 700' includes a lens 710', a first light-transmitting layer 720' and a second light-transmitting layer 730'. A plurality of photosensitive regions 740' separated from each other are arranged on the photosensitive surface under the optical system 700', and the photosensitive regions 740' are surrounded by a non-photosensitive region 741'. As shown in FIG. 7E, the first light-transmitting layer 720' includes a first dielectric layer 721' and a second dielectric layer 722', and the second dielectric layer 722' has the structure as shown in FIG. 7B.

The formation of light spots by the optical system 700 according to the aspects of the present disclosure will be described with reference to FIG. 7C and FIG. 7D. As shown in FIG. 7D, the lateral face 11 of the concave triangular prism 722-1 and the lateral face 11 of the concave triangular prism 722-2 together form a light spot on the photosensitive region 740 numbered as 1. Furthermore, as shown in FIG. 7C, this light spot is a stripe-shaped light spot 750, which covers not only the photosensitive region 740 numbered as 1 but also the photosensitive region 740 numbered as 3. In addition, as shown in FIG. 7D, the lateral face 12 of the concave triangular prism 722-1 and the lateral face 12 of the concave triangular prism 722-2 together form a light spot on the photosensitive region 740 numbered as 2. Furthermore, as shown in FIG. 7C, this light spot is a stripe-shaped light spot 750, which covers not only the photosensitive region 740 numbered as 2 but also the photosensitive region 740 numbered as 4.

The formation of light spots by the optical system 700' according to the aspects of the present disclosure will be described with reference to FIG. 7C and FIG. 7E. As shown in FIG. 7E, the lateral face 11' of the convex triangular prism 722'-1 and the lateral face 11' of the convex triangular prism 722'-2 together form a light spot on the photosensitive region 740' numbered as 1. Furthermore, as shown in FIG. 7C, this light spot is a stripe-shaped light spot 750', which covers not only the photosensitive region 740' numbered as 1, but also the photosensitive region 740' numbered as 3. In addition, as shown in FIG. 7E, the lateral face 12' of the convex triangular prism 722'-1 and the lateral face 12' of the convex triangular prism 722'-2 together form a light spot on the photosensitive region 740' numbered as 2. Furthermore, as shown in FIG. 7C, this spot is a stripe-shaped light spot 750', which covers not only the photosensitive region 740' numbered as 2, but also the photosensitive region 740' numbered as 4.

Figure 8A:
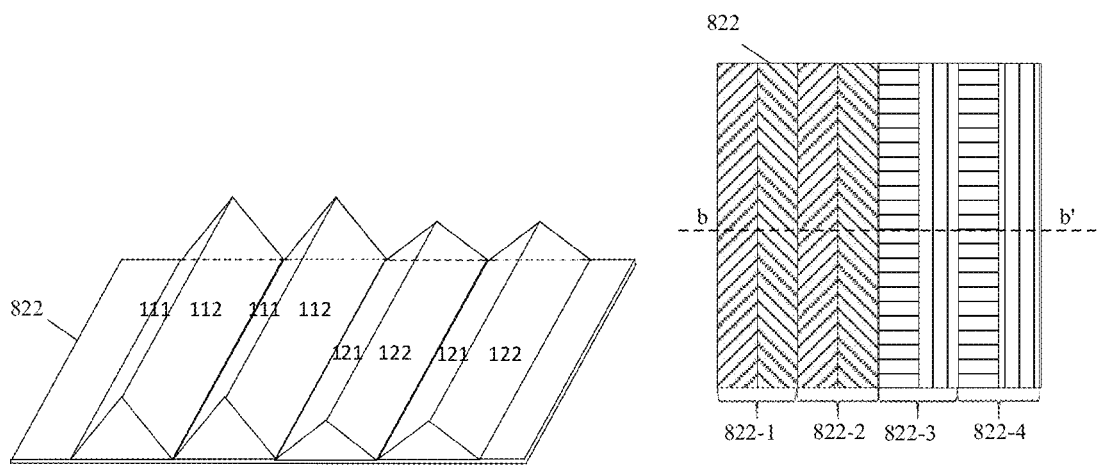
FIG. 8A shows a schematic perspective view and a schematic top view of another example second dielectric layer according to an aspect of the present disclosure.
Figure 8B:
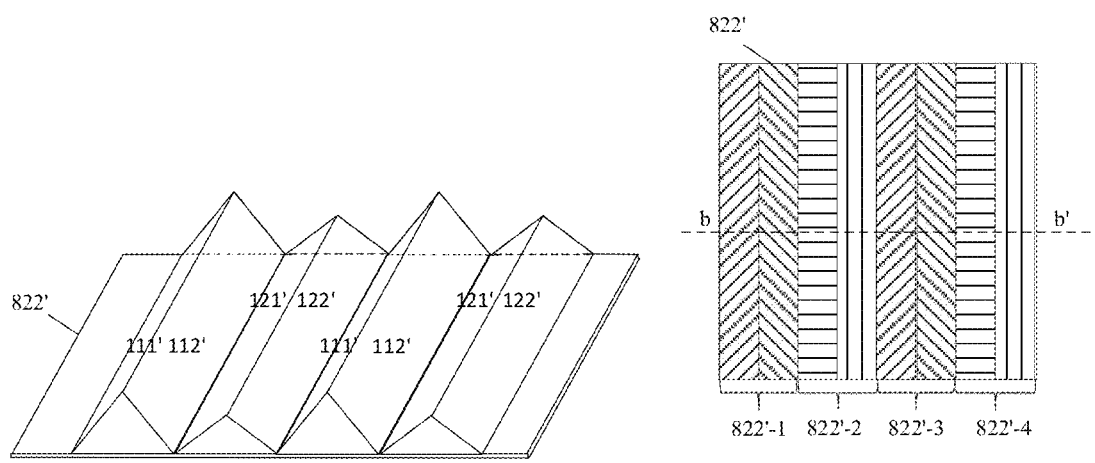
FIG. 8B shows a schematic perspective view and a schematic top view of another example second dielectric layer according to an aspect of the present disclosure.

According to the aspects of the present disclosure, triangular prisms of at least two different sizes can also be formed in the second dielectric layer, and different arrangements for the triangular prisms of the at least two different sizes are shown in FIGS. 8A and 8B. In FIG. 8A, triangular prisms of two different sizes are arranged in different regions, and in FIG. 8B, triangular prisms of two different sizes are alternately arranged. In the aspects of the present disclosure, the size of a polygonal prism can be defined based on the angle between the prism face (hereinafter referred to as the lateral face) for light refraction and the bottom face of the polygonal prism. The angles of the lateral faces for light refraction of polygonal prisms of different sizes are different.

FIG. 8A shows a schematic perspective view and a top view of a second dielectric layer 822 according to an aspect of the present disclosure. The second dielectric layer 822 includes four convex triangular prisms arranged side by side. Optionally, each triangular prism is axisymmetric. The four convex triangular prisms are numbered as 822-1, 822-2, 822-3 and 822-4 from left to right, among which triangular prisms 822-1 and 822-2 have a first size and are grouped into a first triangular prism group, and triangular prisms 822-3 and 822-4 have a second size and are grouped into a second triangular prism group. Therefore, in FIG. 8A, from left to right, there are a first triangular prism group region and a second triangular prism group region, all triangular prisms with the first size are arranged in turn in the first triangular prism group region, and all triangular prisms with the second size are arranged in turn in the second triangular prism group region. In FIG. 8A, two lateral faces of each of triangular prisms 822-1 and 822-2 are numbered as 111 and 112 respectively, and two lateral faces of each of triangular prisms 822-3 and 822-4 are numbered as 121 and 122 respectively. In order to highlight the lateral faces, the lateral faces 111, 112, 121, and 122 are shown using different lines in the top view of the right figure of FIG. 8A.

FIG. 8B shows a schematic diagram and a top view of a second dielectric layer 822' according to an aspect of the present disclosure. The second dielectric layer 822' includes four convex triangular prisms arranged side by side. Optionally, each triangular prism is axisymmetric. The four convex triangular prisms are numbered as 822'-1, 822'-2, 822'-3 and 822'-4 from left to right, among which triangular prisms 822'-1 and 822'-3 have a first size and are grouped into a first triangular prism group, and triangular prisms 822'-2 and 822'-4 have a second size and are grouped into a second triangular prism group. Therefore, in FIG. 8B, from left to right, triangular prisms with the first size and triangular prisms with the second size are alternately arranged. In FIG. 8B, two lateral faces of each of triangular prisms 822'-1 and 822'-3 are respectively numbered as 111' and 112', and two lateral faces of each of triangular prisms 822'-2 and 822'-4 are respectively numbered as 121' and 122'. In order to highlight the lateral faces, the lateral faces 111', 112', 121' and 122' are shown using different lines in the top view of the right figure of FIG. 8B.

It should be understood that although only two triangular prism groups are shown in FIGS. 8A and 8B and each triangular prism group includes two triangular prism structures, the present disclosure is not limited to this, and the number of triangular prism groups with concave structures or convex structures arranged side by side according to the aspects of the present disclosure may be greater than 2, and the number of triangular prisms in each triangular prism group may also be greater than 2.

Figure 8C:
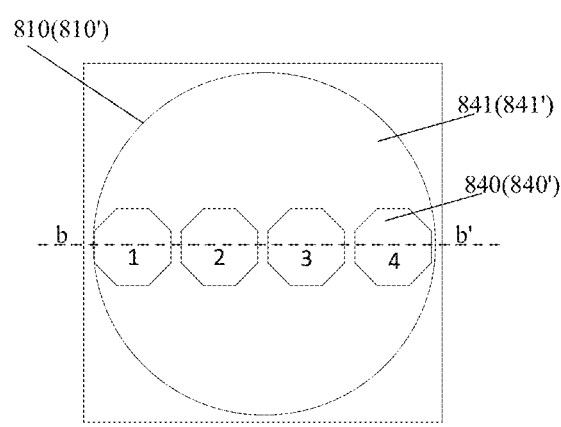
FIG. 8C shows a schematic top view of photosensitive regions used for the second dielectric layer shown in FIGS. 8A and 8B according to an aspect of the present disclosure.

FIG. 8C shows an example arrangement of photosensitive regions 840 (840') for the structure of the second dielectric layer 822 (822') shown in FIGS. 8A and 8B.

Figure 8D:
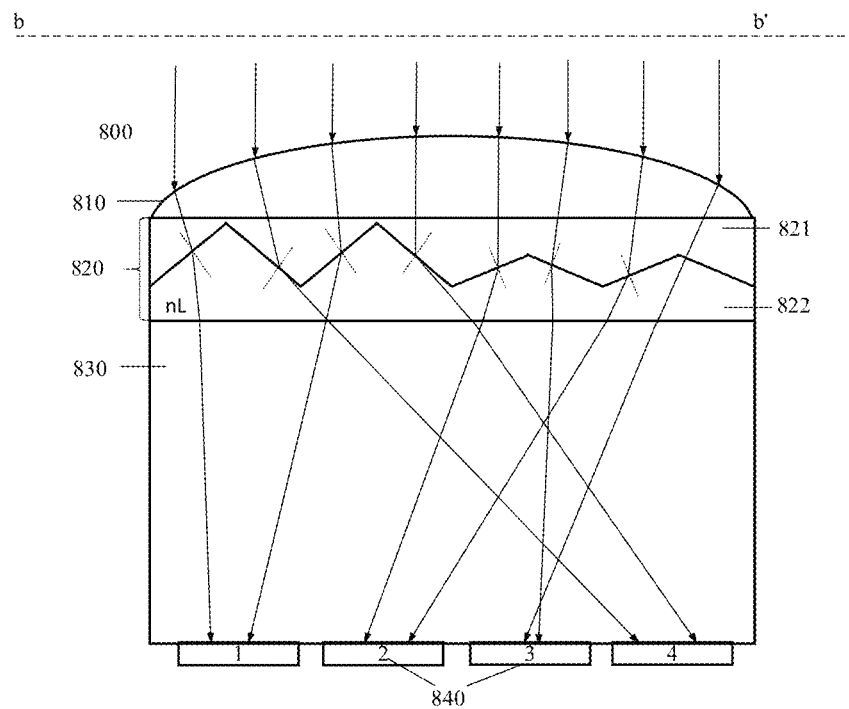
FIG. 8D shows a schematic cross-sectional side view illustrating the formation of the light spots when the optical system adopts the second dielectric layer shown in FIG. 8A according to an aspect of the present disclosure.

FIG. 8D shows a schematic diagram of an optical system 800 according to an aspect of the present disclosure, which is a cross-sectional view along the line bb'. The optical system 800 includes a lens 810, a first light-transmitting layer 820 and a second light-transmitting layer 830. On the photosensitive surface under the optical system 800, a plurality of photosensitive regions 840 separated from each other are arranged, and the photosensitive regions 840 are surrounded by a non-photosensitive region 841 (as shown in FIG. 8C). As shown in FIG. 8D, the first light-transmitting layer 820 includes a first dielectric layer 821 and a second dielectric layer 822, and the second dielectric layer 822 has the structure as shown in FIG. 8A.

Figure 8E:
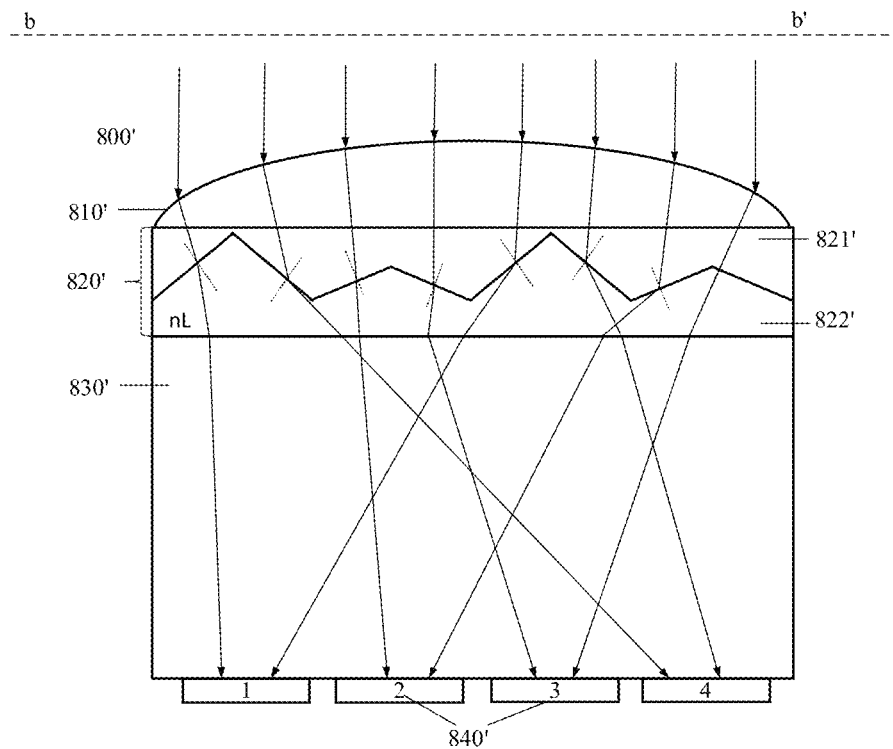
FIG. 8E shows a schematic cross-sectional side view illustrating the formation of the light spots when the optical system adopts the second dielectric layer shown in FIG. 8B according to an aspect of the present disclosure.

FIG. 8E shows a schematic diagram of an optical system 800' according to an aspect of the present disclosure, which is a cross-sectional view along the line bb'. The optical system 800' includes a lens 810', a first light-transmitting layer 820' and a second light-transmitting layer 830'. A plurality of photosensitive regions 840' separated from each other are arranged on the photosensitive surface under the optical system 800', and the photosensitive regions 840' are surrounded by a non-photosensitive region 841' (as shown in FIG. 8C). As shown in FIG. 8E, the first light-transmitting layer 820' includes a first dielectric layer 821' and a second dielectric layer 822', and the second dielectric layer 822' has the structure as shown in FIG. 8B.

The formation of light spots by the optical system 800 according to the aspects of the present disclosure will be described with reference to FIGS. 8A and 8D. As shown in FIG. 8D, the lateral face 111 of the triangular prism 822-1 and the lateral face 111 of the triangular prism 822-2 together form a light spot on the photosensitive region 840 numbered as 1. The lateral face 112 of the triangular prism 822-1 and the lateral face 112 of the triangular prism 822-2 together form a light spot on the photosensitive region 840 numbered as 4. The lateral face 121 of the triangular prism 822-3 and the lateral face 121 of the triangular prism 822-4 together form a light spot on the photosensitive region 840 numbered as 2. The lateral face 122 of the triangular prism 822-3 and the lateral face 122 of the triangular prism 822-4 together form a light spot on the photosensitive region 840 numbered as 3.

The formation of light spots by the optical system 800' according to the aspects of the present disclosure will be described with reference to FIG. 8B and FIG. 8E. As shown in FIG. 8E, the lateral face 111' of triangular prism 822'-1 and the lateral face 111' of triangular prism 822'-3 together form a light spot on the photosensitive region 840' numbered as 1. The lateral face 112' of the triangular prism 822'-1 and the lateral face 112' of the triangular prism 822'-3 together form a light spot on the photosensitive region 840' numbered as 4. The lateral face 121' of the triangular prism 822'-2 and the lateral face 121' of the triangular prism 822'-4 together form a light spot on the photosensitive region 840' numbered as 2. The lateral face 122' of the triangular prism 822'-2 and the lateral face 122' of the triangular prism 822'-4 together form a light spot on the photosensitive region 840' numbered as 3.

Figure 8F:
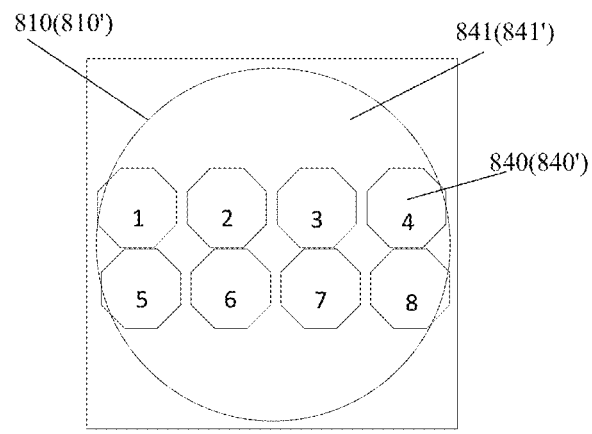
FIG. 8F shows a schematic top view of a two-dimensional array of photosensitive regions used for the second dielectric layer shown in FIGS. 8A and 8B according to an aspect of the present disclosure.

In addition, although FIG. 8C shows a case where the plurality of photosensitive regions are arranged in a linear array (i.e., one-dimensional array), it should be understood that the optical systems 800, 800' of FIGS. 8A and 8B can also be applied to a case where a plurality of photosensitive regions are arranged in a two-dimensional array. In this case, the photosensitive regions located in the same column receive light beams from the same prism lateral face(s). The optical systems 800, 800' of FIGS. 8A and 8B are still taken as an example for description. For example, as shown in FIG. 8F, the plurality of photosensitive regions can be arranged in a two-dimensional array of 2*4 with 4 photosensitive pixels in each row and 2 photosensitive pixels in each column. The optical systems 800, 800' form four stripe-shaped light spots, and each stripe-shaped light spot covers the photosensitive regions located in the same column. In addition, the photosensitive regions can also be arranged in a two-dimensional array of 3*4 or 4*4.

With reference to FIGS. 8F and 8D, the formation of light spots on the photosensitive regions of the two-dimensional array will be described. As shown in FIGS. 8D and 8F, the lateral face 111 of triangular prism 822-1 and the lateral face 111 of triangular prism 822-2 together form a light spot on the photosensitive regions 840 numbered as 1 and 5. The lateral face 112 of the triangular prism 822-1 and the lateral face 112 of the triangular prism 822-2 together form a light spot on the photosensitive regions 840 numbered as 4 and 8. The lateral face 121 of the triangular prism 822-3 and the lateral face 121 of the triangular prism 822-4 together form a light spot on the photosensitive regions 840 numbered as 2 and 6. The lateral face 122 of the triangular prism 822-3 and the lateral face 122 of the triangular prism 822-4 together form a light spot on the photosensitive regions 840 numbered as 3 and 7.

In addition, according to the aspects of the present disclosure, the plurality of photosensitive regions can be arranged in a two-dimensional array of P*Q, in which each row has Q photosensitive pixels and each column has P photosensitive pixels, where the number Q of columns is determined by the number Ng of polygonal prism groups with concave or convex structures arranged side by side and the number No of the stripe-shaped light spots formed by each polygonal prism group. The photosensitive regions located in the same column receive light beams from the same lateral face(s) of the same polygonal prism group. For example, Q is equal to the product of Ng and No.

It should be understood that although the upper surface of the second dielectric layer is shown to include a plurality of convex structures arranged side by side in both FIGS. 8A and 8B, it should be understood that the aspects of the present disclosure are not limited to this. Based on the content of the aspects of the present disclosure, it is easy for those skilled in the art to obtain that the upper surface of the second dielectric layer includes a plurality of concave structures arranged side by side, which will not be repeated here.

Although the convex structures shown in FIG. 7A, FIG. 7B, FIG. 8A and FIG. 8B are all triangular prism structures, it should be understood that the aspects of the present disclosure are not limited to this, and other polygonal prism structure may be adopted, and the number of lateral faces of the polygonal prism structure is greater than 2. For example, the polygonal prism may be a pentagonal prism with four lateral faces. It should be understood that the size of the polygonal prism and the number of lateral faces (excluding the bottom surface) of the polygonal prism can be set according to the number of photosensitive regions.

Although FIGS. 3A-8E all show various aspects of forming a concave structure or a convex structure on the upper surface of the second dielectric layer, it should be understood that in the various aspects of the present disclosure, a concave structure or a convex structure can also be formed on the lower surface of the second dielectric layer.

Figure 9A:
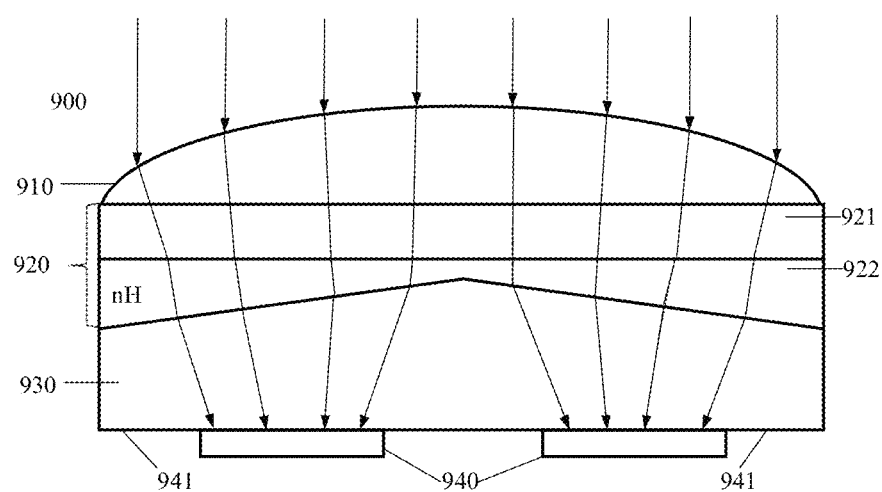
FIG. 9A shows a schematic cross-sectional side view illustrating the formation of the light spots when the optical system in which a concave structure is arranged on the lower surface of the second dielectric layer is adopted according to an aspect of the present disclosure.

FIG. 9A shows a schematic diagram of an optical system 900 with a concave structure arranged on the lower surface of the second dielectric layer according to an aspect of the present disclosure. The optical system 900 includes a lens 910, a first light-transmitting layer 920 and a second light-transmitting layer 930. A plurality of photosensitive regions 940 separated from each other are arranged on the photosensitive surface under the optical system 900, and the photosensitive regions 940 are surrounded by a non-photosensitive region 941. As shown in FIG. 9A, the first light-transmitting layer 920 includes a first dielectric layer 921 and a second dielectric layer 922, and a concave structure is arranged on the lower surface of the second dielectric layer 922. It should be understood that the concave structure(s) arranged on the lower surface of the second dielectric layer 922 can adopt one or more concave structures as shown in FIGS. 4A, 5A, 6A and 7A, and a plurality of concave structures can also be correspondingly arranged as shown in FIGS. 8A and 8B, which will not be described here.

Figure 9B:
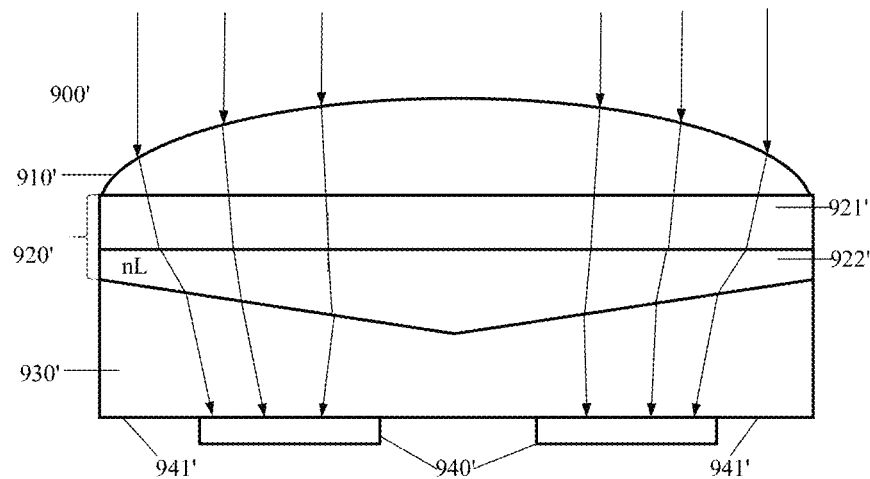
FIG. 9B shows a schematic cross-sectional side view illustrating the formation of the light spots when the optical system in which a convex structure is arranged on the lower surface of the second dielectric layer is adopted according to an aspect of the present disclosure.

FIG. 9B shows a schematic diagram of an optical system 900' with a convex structure arranged on the lower surface of the second dielectric layer according to an aspect of the present disclosure. The optical system 900' includes a lens 910', a first light-transmitting layer 920' and a second light-transmitting layer 930'. A plurality of photosensitive regions 940' separated from each other are arranged on the photosensitive surface under the optical system 900', and the photosensitive regions 940' are surrounded by a non-photosensitive region 941'. As shown in FIG. 9B, the first light-transmitting layer 920' includes a first dielectric layer 921' and a second dielectric layer 922', and a convex structure is arranged on the lower surface of the second dielectric layer 922'. It should be understood that the convex structure arranged on the lower surface of the second dielectric layer 922 can adopt one or more convex structures as shown in FIGS. 4B, 5B, 6B, 7B, 8A and 8B, which will not be repeated here.

It should be understood that although the first dielectric layer, the second dielectric layer and the second light-transmitting layer are sequentially arranged between the lens and the photosensitive region in FIGS. 3A-9B, it should be understood that the second dielectric layer may be interposed in the first dielectric layer and form a concave structure or a convex structure on the upper or lower surface of the second dielectric layer.

Figure 10:
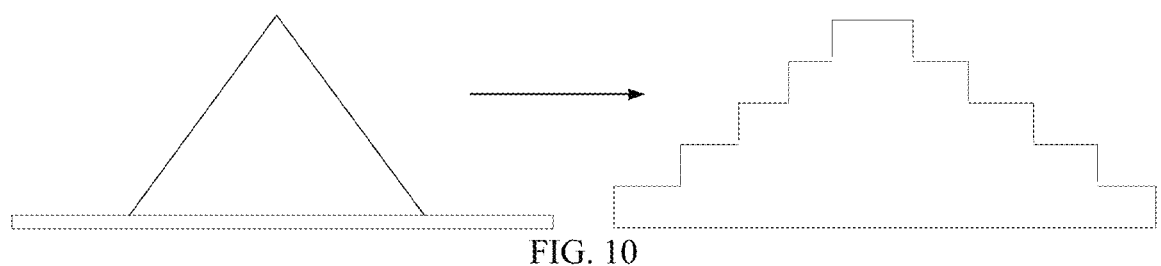
FIG. 10 is a schematic diagram of an alternative implementation of a triangular prism structure according to an aspect of the present disclosure.

FIG. 10 is a schematic diagram of an alternative implementation of a triangular prism according to an aspect of the present disclosure.

According to the aspects of the present disclosure, the lateral faces of the convex triangular prism structure shown in FIGS. 5B, 7B, 8A and 8B (as shown in the left figure of FIG. 10) can be realized as a stepped multi-stage phase structure, as shown in the right figure of FIG. 10, so that the difficulty of manufacturing triangular prism can be reduced, and the manufacturing cost can be reduced. Similarly, the lateral faces of the concave triangular prism structure can also be realized as a stepped multi-stage phase structure. In addition to the triangular prism structure, according to the aspects of the present disclosure, the lateral faces of the polygonal prism structure arranged on the second dielectric layer can also be realized as a stepped multi-stage phase structure.

According to the aspects of the present disclosure, the lateral faces of the polygonal pyramid structure in FIGS. 4A-4E and 6A-6E can also be realized as a stepped multi-stage phase structure.

According to the aspects of the present disclosure, for example, for any of the second dielectric layers in FIGS. 3C-9B, the second dielectric layer may include a substrate layer and one or more convex structures formed on the substrate layer, or the second dielectric layer may include a substrate layer and one or more concave structures formed in the substrate layer.

According to the aspects of the present disclosure, there is also provided an optical sensing unit, which includes the optical system described in conjunction with FIGS. 3A-10 and a plurality of photosensitive regions separated from each other arranged under the optical system.

The optical sensing unit according to the aspects of the present disclosure may have the structures shown in, for example, FIGS. 3A-3D, 4A-4E, 5A-5C, 6A-6E, 7A-7E, 8A-8E and 9A-9B. The optical sensing unit includes an optical system and photosensitive regions. For example, referring to FIGS. 3C and 3B, the optical sensing unit includes an optical system 300 and photosensitive regions 340. The optical system 300 includes a lens 310, a first light-transmitting layer 320 and a second light-transmitting layer 330. The optical system 300 forms a plurality of light spots, such as a plurality of light spots 350, on a plurality of photosensitive regions 340 separated from each other. The specific ways of forming multiple light spots can be found in the above descriptions of various aspects of the present disclosure, which will not be repeated here. The photosensitive regions are formed by photosensitive devices, which can be photodiodes or single-photon avalanche diodes (SPADs), and the photosensitive regions can be regions covered by the photodiodes or the single-photon avalanche diodes (SPADs), or light receiving (active) regions of the photodiodes or the single-photon avalanche diodes (SPADs).

By using the optical system including the second dielectric layer according to the aspects of the present disclosure, the incident light beam can correspondingly form a plurality of light spots on a plurality of photosensitive regions separated from each other, thereby improving the efficiency of light sensing of the optical sensing unit.

According to an aspect of the present disclosure, there is also provided an optical sensing module, which includes a plurality of optical sensing units arranged in an array, and each optical sensing unit is the optical sensing unit as in the above aspects of the present disclosure.

Figure 1A:
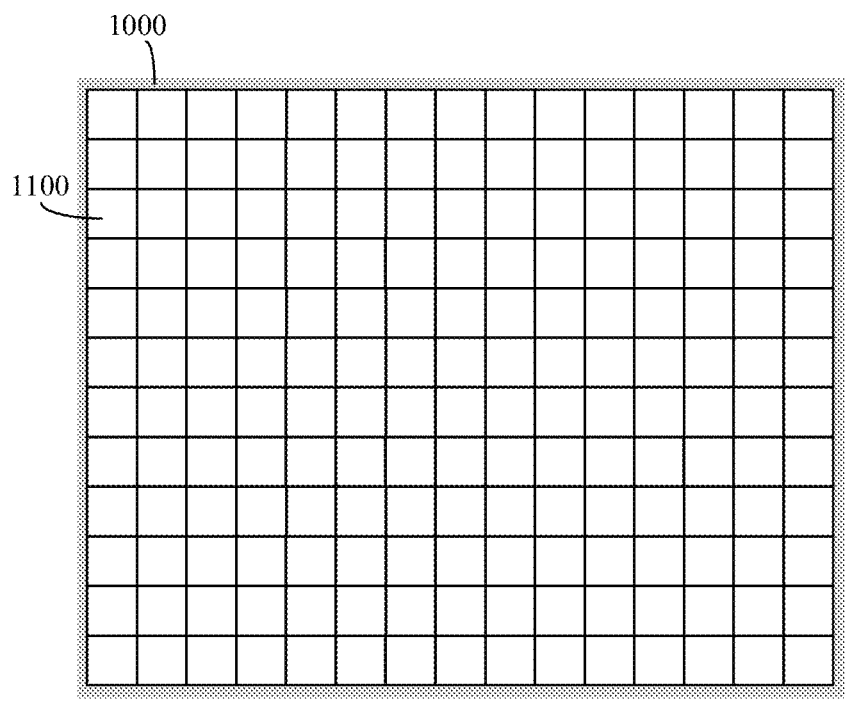
FIG. 1A is a schematic diagram of an optical sensing array in prior art.
Figure 1B:
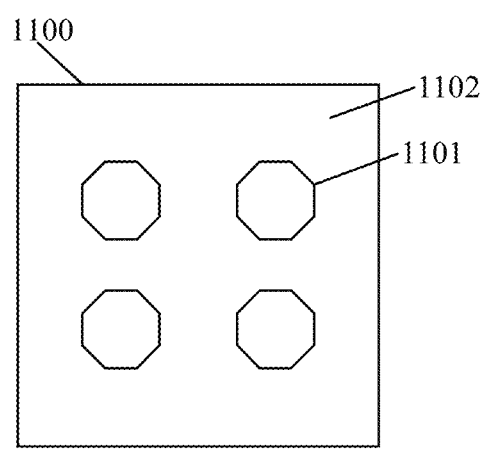
FIGS. 1B and 1C are a schematic top view and a schematic cross-sectional side view of the optical sensing unit 1100 in FIG. 1A, respectively.
Figure 1C:
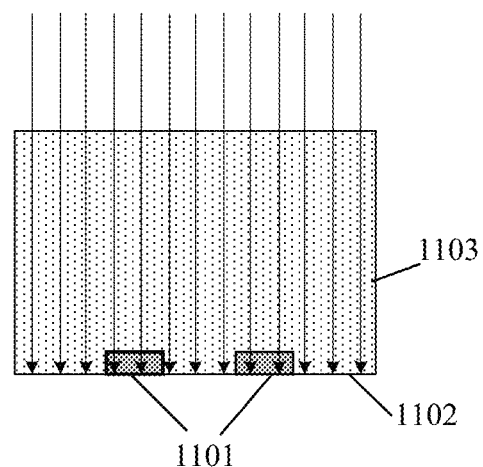

Referred to FIG. 1A, the optical sensing module according to the aspect of the present disclosure can be obtained, which includes a plurality of optical sensing units arranged in an array, and each optical sensing unit is, for example, a combination of an optical system 300 and photosensitive regions 340.

The following points need to be explained:
(1) The drawings of the aspects of the present disclosure only refer to the structures related to the aspects of the present disclosure, and other structures can refer to the general design.
(2) Without conflict, the aspects of the present disclosure and the features in the aspects can be combined with each other to obtain a new aspect.

The above is only the specific implementation of the present disclosure, but the scope of protection of the present disclosure is not limited to this. The scope of protection of the present disclosure should be based on the scope of protection of the claims.

What is claimed is:

1. An optical system, for forming a plurality of light spots on a plurality of photosensitive regions separated from each other, comprising:
   a lens for receiving a first light beam and converging the first light beam;
   a first light-transmitting layer, located under the lens and used for refracting the converged first light beam into a plurality of second light beams, wherein the plurality of second light beams are used for forming the plurality of light spots on the plurality of photosensitive regions, wherein each light spot of the plurality of light spots covers at least one of the plurality of photosensitive regions; and
   a second light-transmitting layer, located under the first light-transmitting layer, wherein the plurality of second light beams are respectively incident on the plurality of photosensitive regions through the second light-transmitting layer, and the lens covers the plurality of photosensitive regions.

2. The optical system according to claim 1, wherein the first light-transmitting layer comprises a first dielectric layer and a second dielectric layer; wherein,
   the upper surface of the second dielectric layer is provided with at least one convex structure or at least one concave structure, and each structure of the at least one convex structure or the at least one concave structure refracts light incident on its light-incident surface, so that the converged first light beam is refracted into the plurality of second light beams; or
   the lower surface of the second dielectric layer is provided with at least one convex structure or at least one concave structure, and each structure of the at least one convex structure or the at least one concave structure refracts light to be emitted from its light-emitting surface, so that the converged first light beam is refracted into the plurality of second light beams.

3. The optical system according to claim 2, wherein each structure of the at least one convex structure or the at least one concave structure is a polygonal pyramid, and a number of lateral faces of each polygonal pyramid is equal to a number of the plurality of photosensitive regions.

4. The optical system according to claim 2, wherein each structure of the at least one convex structure or the at least one concave structure is a polygonal prism, and a number of lateral faces of each polygonal prism is related to a number of the plurality of photosensitive regions.

5. The optical system according to claim 2, wherein the second dielectric layer is provided with a plurality of convex structures or a plurality of concave structures,
   wherein the plurality of convex structures or the plurality of concave structures are arranged in an array of N*M, N and M are integers greater than or equal to 2, and N is equal to or not equal to M.

6. The optical system according to claim 2, wherein the second dielectric layer is provided with a plurality of convex structures or a plurality of concave structures,
   wherein each structure of the plurality of convex structures or the plurality of concave structures is an axisymmetric polygonal prism, and the plurality of convex structures or the plurality of concave structures are arranged in parallel to form a linear array; and
   a number of lateral faces for light refraction of each polygonal prism is related to a number of the plurality of photosensitive regions.

7. The optical system according to claim 6, wherein each polygonal prism is a triangular prism, at least two triangular prisms form a triangular prism group, and each triangular prism group is used for forming two stripe-shaped light spots.

8. The optical system according to claim 6, wherein the plurality of convex structures or the plurality of concave structures comprise polygonal prisms of at least two sizes, and angles of lateral faces for light refraction of polygonal prisms of different sizes are different.

9. The optical system according to claim 8, wherein the plurality of convex structures or the plurality of concave structures comprise triangular prisms of two sizes, and triangular prisms of a first size and triangular prisms of a second size are alternately arranged,
   wherein the triangular prisms of the first size form a first triangular prism group, and the triangular prisms of the second size form a second triangular prism group, and each triangular prism group is used for forming two striped-shaped light spots.

10. The optical system according to claim 8, wherein the plurality of convex structures or the plurality of concave structures comprise triangular prisms of two sizes, and triangular prisms of a first size and triangular prisms of a second size are arranged in different regions,
    wherein the triangular prisms of the first size form a first triangular prism group, and the triangular prisms of the second size form a second triangular prism group, and each triangular prism group is used for forming two striped-shaped light spots.

11. The optical system according to claim 2, wherein in case that the second dielectric layer includes at least one convex structure, a refractive index of the second dielectric layer is smaller than the refractive index of the first dielectric layer and is smaller than the refractive index of the second light-transmitting layer; or,
    the refractive index of the second dielectric layer is greater than the refractive index of the first dielectric layer and is smaller than the refractive index of the second light-transmitting layer.

12. The optical system according to claim 11, wherein the refractive index of the first dielectric layer is less than or equal to the refractive index of the lens.

13. The optical system according to claim 2, wherein in case that the second dielectric layer includes at least one concave structure, a refractive index of the second dielectric layer is greater than the refractive index of the first dielectric layer and is greater than the refractive index of the second light-transmitting layer.

14. The optical system according to claim 13, wherein the refractive index of the first dielectric layer is greater than or equal to the refractive index of the lens.

15. The optical system according to claim 11, wherein the greater a difference between the refractive index of the second dielectric layer and the refractive index of the first dielectric layer is, the farther the light spots formed through the plurality of second light beams are from each other; and/or
the greater the difference between the refractive index of the second dielectric layer and the refractive index of the second light-transmitting layer is, the farther the light spots formed through the plurality of second light beams are from each other.

16. The optical system according to claim 2, wherein the first dielectric layer is interposed between the lens and the second dielectric layer, or the second dielectric layer is interposed in the first dielectric layer.

17. The optical system according to claim 2, wherein a lateral face of each of the at least one convex structure or the at least one concave structure comprises a stepped multistage phase structure.

18. The optical system according to claim 2, wherein,
in case that the second dielectric layer includes one or more convex structures, the second dielectric layer includes a substrate layer and one or more convex structures formed on the substrate layer;
in case that the second dielectric layer includes one or more concave structures, the second dielectric layer includes a substrate layer and one or more concave structures formed in the substrate layer.

19. An optical sensing unit, comprising:
a lens for receiving a first light beam and converging the first light beam;
a first light-transmitting layer, located under the lens and used for refracting the converged first light beam into a plurality of second light beams;
a second light-transmitting layer, located under the first light-transmitting layer and used for refracting the plurality of second light beams; and
a plurality of photosensitive regions separated from each other, located under the second light-transmitting layer and used for sensing an intensity of the plurality of second light beams after being refracted by the second light-transmitting layer;
wherein the plurality of second light beams are used for forming a plurality of light spots, and each light spot in the plurality of light spots covers a part of at least one of the plurality of photosensitive regions.

20. An optical sensing module comprising a plurality of optical sensing units according to claim 19 arranged in an array.

21. The optical sensing module of claim 20, wherein each optical sensing unit is independent of each other, and the plurality of optical sensing units include lenses independent of each other.

* * * * *